US012154597B2

(12) United States Patent
Jia et al.

(10) Patent No.: US 12,154,597 B2
(45) Date of Patent: Nov. 26, 2024

(54) VIDEO GENERATION APPARATUS AND VIDEO GENERATION METHOD PERFORMED BY THE VIDEO GENERATION APPARATUS

(71) Applicant: SAMSUNG ELECTRONICS CO., LTD., Suwon-si (KR)

(72) Inventors: Hanchao Jia, Beijing (CN); Luman Ma, Beijing (CN); Xiaobing Wang, Beijing (CN); Yingying Jiang, Beijing (CN); Bo Zhu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/140,732

(22) Filed: Jan. 4, 2021

(65) Prior Publication Data

US 2021/0210119 A1    Jul. 8, 2021

(30) Foreign Application Priority Data

Jan. 3, 2020   (CN) .......................... 202010006953.4
May 15, 2020   (KR) ........................ 10-2020-0058449

(51) Int. Cl.
*G11B 27/06*   (2006.01)
*G06V 20/40*   (2022.01)
(Continued)

(52) U.S. Cl.
CPC .............. *G11B 27/06* (2013.01); *G06V 20/41* (2022.01); *G06V 20/46* (2022.01); *G06V 20/48* (2022.01); *G06V 20/49* (2022.01);
*G06V 40/10* (2022.01); *G11B 27/031* (2013.01); *G11B 27/102* (2013.01); *G11B 27/34* (2013.01)

(58) Field of Classification Search
None
See application file for complete search history.

(56) References Cited

U.S. PATENT DOCUMENTS 8,208,067 B1   6/2012   Singh et al.
9,990,918 B1   6/2018   Chan et al.
(Continued)

FOREIGN PATENT DOCUMENTS

CA   2 924 065 A1   3/2015
CN   102543136 A    7/2012
(Continued)

OTHER PUBLICATIONS

International Search Report (PCT/ISA/210) and Written Opinion (PCT/ISA/237) issued by the International Searching Authority in International Application No. PCT/KR2021/000010, issued on Apr. 8, 2021.
(Continued)

*Primary Examiner* — Gelek W Topgyal
(74) *Attorney, Agent, or Firm* — Sughrue Mion, PLLC

(57) ABSTRACT

A video generation method includes obtaining action clips into which source videos are split, through action recognition with respect to the source videos, selecting target clips from among the action clips, based on correlation between clip features of at least some of the action clips and an intention feature extracted from a video generation request, and generating a target video by combining at least some of the target clips.

19 Claims, 20 Drawing Sheets

(51) Int. Cl.
*G06V 40/10* (2022.01)
*G11B 27/031* (2006.01)
*G11B 27/10* (2006.01)
*G11B 27/34* (2006.01)

(56) References Cited

U.S. PATENT DOCUMENTS

| | | | |
|---|---|---|---|
| 10,459,975 B1 | 10/2019 | Malpani | |
| 10,509,966 B1* | 12/2019 | Noel | G11B 27/28 |
| 10,777,228 B1* | 9/2020 | Wilson | G11B 27/02 |
| 11,328,013 B2* | 5/2022 | Novikoff | G06F 16/738 |
| 2003/0177503 A1* | 9/2003 | Sull | G11B 27/28 |
| | | | 725/135 |
| 2011/0311137 A1 | 12/2011 | Liu et al. | |
| 2012/0219064 A1 | 8/2012 | Zheng et al. | |
| 2012/0237126 A1 | 9/2012 | Choi et al. | |
| 2013/0108241 A1* | 5/2013 | Miyamoto | H04N 21/8549 |
| | | | 386/241 |
| 2016/0239711 A1* | 8/2016 | Gong | G06V 40/173 |
| 2016/0307598 A1* | 10/2016 | Johns | G11B 27/10 |
| 2017/0256284 A1 | 9/2017 | Uchihashi et al. | |
| 2018/0249193 A1 | 8/2018 | Zhang et al. | |
| 2019/0013047 A1* | 1/2019 | Wait | G11B 27/34 |
| 2019/0267041 A1* | 8/2019 | Ricciardi | H04N 21/23418 |
| 2019/0354765 A1* | 11/2019 | Chan | H04N 21/2187 |
| 2020/0117909 A1* | 4/2020 | Noel | G06V 20/47 |
| 2020/0183974 A1* | 6/2020 | Park | G06F 16/75 |
| 2020/0358979 A1 | 11/2020 | Schwartz et al. | |

FOREIGN PATENT DOCUMENTS

| | | |
|---|---|---|
| CN | 102890700 A | 1/2013 |
| CN | 105630833 A | 6/2016 |
| CN | 108509465 A | 9/2018 |
| CN | 108664931 A | 10/2018 |
| CN | 108830208 A | 11/2018 |
| CN | 109195011 A | 1/2019 |
| CN | 109740499 A | 5/2019 |
| CN | 109922373 A | 6/2019 |
| CN | 110096938 A | 8/2019 |
| CN | 110166827 A | 8/2019 |
| CN | 110267116 A | 9/2019 |
| JP | 2006-217045 A | 8/2006 |
| JP | 2012-019305 A | 1/2012 |
| JP | 2017-505012 A | 2/2017 |
| KR | 10-1979919 B1 | 5/2019 |
| WO | 2014/176470 A1 | 10/2014 |

OTHER PUBLICATIONS

Xin Ai et al. "Unsupervised Video Summarization based on Consistent Clip Generation" IEEE Fourth International Conference on Multimedia Big Data (BigMM), 2018, (7 pages total).

Communication dated Mar. 6, 2024, issued by the State Intellectual Property Office of P.R. China in counterpart Chinese Application No. 202010006953.4.

Bhaumik et al., "Real-Time Storyboard Generation in Videos Using a Probability Distribution based Threshold," 2015 Fifth International Conference on Communication Systems and Network Technologies, 2015, pp. 425-431.

Wang et al., "Video highlight extraction based on the interests of users," Journal of Image and Graphics, vol. 23, No. 5, pp. 748-755, May 2018.

Yifan Jiao, "Video Highlight Detection via Deep Learning," Jiangsu University of Science and Technology, Jun. 2018, total 76 pages.

Research and Implementation of Human Behavior Recognition System Based on GCN, Liaoning University, Jun. 15, 2019, 86 pages.

R. Venkatesan et al., "Real Time Implementation On Moving Object Tracking And Recognisation Using Matlab", 2012 International Conference on Computing, Communication and Applications, Apr. 5, 2012, 8 pages.

Communication issued on Jul. 26, 2024 by the China National Intellectual Property Administration for Chinese Patent Application No. 202010006953.4.

* cited by examiner

ACTION CLIP

VIDEO GENERATION APPARATUS AND VIDEO GENERATION METHOD PERFORMED BY THE VIDEO GENERATION APPARATUS

CROSS-REFERENCE TO RELATED APPLICATIONS

This application is based on and claims priority under 35 U.S.C. § 119 to Chinese Patent Application No. 202010006953.4, filed on Jan. 3, 2020, in the State Intellectual Property Office (SIPO) of the People's Republic of China and Korean Patent Application No. 10-2020-0058449, filed on May 15, 2020, in the Korean Intellectual Property Office, the disclosures of which are incorporated by reference herein in their entireties.

BACKGROUND

1. Field

The disclosure relates to computer technology, and more particularly, to a method and apparatus for video generation, an electronic device, and a computer-readable storage medium.

2. Description of Related Art

With the rapid development of science and technology and the improvement of people's living standards, film cameras have gradually withdrawn from the stage. Users are becoming more and more accustomed to use mobile phones and other terminal devices in order to shoot photos and videos. However, this shooting method also brings some problems.

Massive videos result in repetition of content within video and difficulties in finding a certain content due to random shooting. In addition, many useless clips are included in the video. Although the video can be edited with software, most of video editing software is too professional to be manipulated by users.

In order to satisfy the user's requirements, there have been some products with video generation functions, but the video generated through existing video generation methods does not satisfy the user's requirements.

SUMMARY

Additional aspects will be set forth in part in the description which follows and, in part, will be apparent from the description, or may be learned by practice of the presented embodiments.

In accordance with an aspect of the disclosure, a video generation method includes extracting an intention feature of a video generation request, and generating a target video based on the intention feature and source videos.

The intention feature may include an action intention feature.

The generating of the target video based on the intention feature and the source videos may include extracting video features of the source videos, determining video clips in the source videos, based on the video features of the source videos, and filtering the video clips, based on the intention feature, to obtain target clips, and generating the target video based on the target clips.

For one of the source videos, the determining of the video clips based on the video feature of the source video may include performing an object recognition on the source video based on the video feature of the source video, to obtain object clips containing a pre-determined object, performing an action recognition on the source video based on the video feature of the source video, to obtain a time length of each of action clips containing actions in the source video, and obtaining the action clips based on the time lengths.

When there are object clips and action clips that belong to the same source video, the generating of the target video based on the target clips may include fusing the object clips and the action clips that belong to the same candidate video, and generating the target video based on fused video clips corresponding to a result of the fusing.

The obtaining of the action clips based on the time lengths may include determining levels of the action clips based on the time lengths, and determining the target clips based on the levels of the action clips.

The determining of the target clips based on the levels of the action clips may include determining target levels from among the levels, and determining action clips belonging to the target level as the target clips.

When the video generation request includes a target length of the target video, the determining of the target level from among the levels may include determining the target level based on a length threshold corresponding to each of the levels and the target length.

The determining of the levels of the action clips based on the time lengths may include determining a length region to which the time length belongs, from among length regions corresponding to the levels, and determining a level corresponding to the length region to which the time length belongs as the level of an action clip or determining a level corresponding to a threshold closest to the time length as the level of the action clip.

There may be a common transition length region between two adjacent levels, and the determining of the level corresponding to the length region to which the time length belongs as the level of the action clip may include determining the two adjacent levels corresponding to the transition length region as the level of the action clip when the time length belongs to the transition length region of the two adjacent levels.

The determining of the target level based on the length threshold corresponding to each of the levels and the target length may include determining a limited length based on the target length, and determining the target level from among the levels according to the length threshold corresponding to each of the levels and the limited length.

The determining of the target level may include comparing a length threshold corresponding to a current level with the limited length sequentially according to the descending order of the levels until the limited length is not less than the length threshold corresponding to the current level, and determining the current level as the target level.

The determining of the target level may include, when the limited length is not less than the length threshold corresponding to the current level, determining the current level as the target level, and, when the limited length is less than the length threshold corresponding to the current level, determining the current level as the target level or determining a next level as the target level, according to a first number of action clips of which time lengths are not less than the limited length, from among the action clips belonging to the current level, and a second number of action clips of which time lengths are not greater than the limited length, from among the action clips belonging to the next level.

The determining of the target level may include, when the first number is no less than the second number, determining the current level as the target level, and, when the first number is less than the second number and the next level is the last level, determining the next level as the target level.

The filtering of the video clips may include obtaining clip features of the video clips, determining correlation between the intention feature and the clip features of the video clips separately, and filtering the video clips based on the correlation corresponding to the video clips to obtain the target clips.

The filtering of the video clips may include obtaining clip features of the video clips, determining a weight of the video clips based on the intention feature and the clip features of the video clips, and selecting video clips to be included in the target video, based on the clip features and the weight.

The selecting of the video clips to be included in the target video may include performing following operations sequentially based on the intention feature and the clip features in order to select video clips corresponding to the following operations at each time point. The operations include determining weights of video clips for a current time point, based on the intention feature, the clip features, and a weight determined at a previous time point as the weight of the video clips, and selecting video clips corresponding to the current time point based on the clip features, the weight of the video clips determined at the current time point, and video clips selected at the previous time point.

The generating of the target video based on the target clips may include filtering the video clips based on the correlation between clips among the video clips, and generating the target video based on target clips obtained as a result of the filtering.

In accordance with an aspect of the disclosure, a video generation apparatus includes an intention feature extractor configured to extract an intention feature of a video generation request, and a video generator configured to generate a target video based on the intention feature and source videos.

In accordance with an aspect of the disclosure, an electronic device includes a memory and a processor, wherein the memory stores a computer program and the processor performs the video generation method when the computer program is executed.

In accordance with an aspect of the disclosure, a computer-readable storage medium stores a computer program that performs the video generation method when the computer program is executed.

According to a technical solution provided in an embodiment of the disclosure, because a user intention is taken into account when generating a target video, the target video may better satisfy actual user intentions and requirements, and thus perception of users with respect to the target video may be improved.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
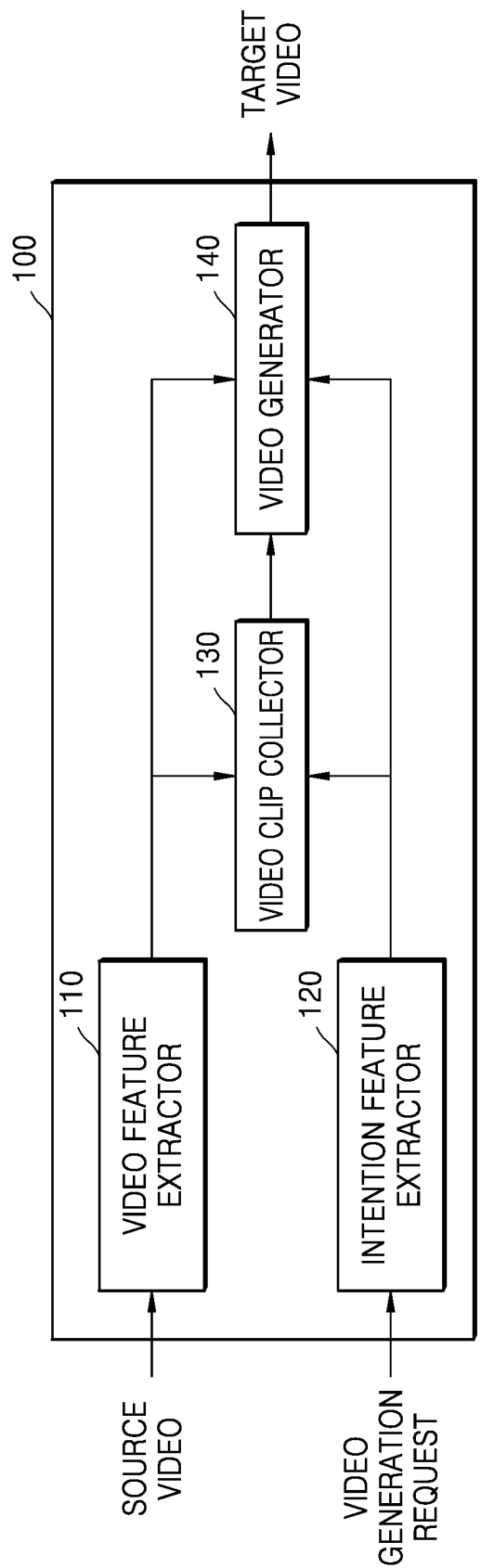
FIG. 1 is a block diagram of a video generation apparatus according to an embodiment.

As the disclosure allows for various changes and numerous examples, particular embodiments will be illustrated in the drawings and described in detail in the written description. The same or similar reference numbers indicate the same or similar elements or elements having the same or similar function. The spirit and technical scope of the disclosure are not limited to the embodiments described through the accompanying drawings, and it is to be appreciated that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of embodiments are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Moreover, in the present specification, 'comprise' or 'include' includes the presence of the described features, steps, actions, and/or components, but addition and presence of one or more other not-described features, steps, actions, components and/or combinations thereof are not excluded.

Furthermore, in the present specification, 'and/or' refers to all of the listed elements, one of the listed elements, or a combination of two or more of the listed elements.

Throughout the disclosure, the expression "at least one of a, b or c" indicates only a, only b, only c, both a and b, both a and c, both b and c, all of a, b, and c, or variations thereof.

With the rapid development of science and technology (especially, the technology of artificial intelligence and computer vision) and the improvement of people's living standards, more and more intelligent data processing methods have appeared in people's daily lives.

Automatic video generation, for example, generating a new video, based on a plurality of videos selected by a user, or generating new videos, based on some clips of one or more videos selected by the user, is one of the intelligent data processing methods.

At least the following areas for improvement exist in existing video generation solutions.

In most video generation methods, some pictures or videos are randomly selected, and then the selected pictures or videos are integrated according to some simple rules (such as, a chronological order), without considering content. The generated videos have poorly-continuous and unnatural content, which makes it difficult to satisfy user requirements. In other words, in existing video generation methods, a user's intention is not considered, and thus it is difficult for a user to generate his or her desired video.

In order to solve at least one problem in the related art, embodiments of the disclosure provide new video generation methods. According to embodiments of the disclosure, fantastic and substantial videos that better satisfy the user requirements may be generated.

FIG. 1 is a block diagram of a video generation apparatus 100 according to an embodiment.

Referring to FIG. 1, the video generation apparatus 100 may include a video feature extractor 110, an intention feature extractor 120, a video clip collector 130, and a video generator 140. The video generation apparatus 100 of FIG. 1 may be an electronic device, for example, any of various types of apparatuses having a video analysis and editing function such as a desktop computer, a laptop computer, a smartphone, and a table personal computer (PC).

The video feature extractor 110 extracts video features (e.g., a dual stream feature to be described later) from a source video, and the intention feature extractor 120 extracts intention features from a video generation request.

According to an embodiment, the video feature extractor 110 and the intention feature extractor 120 may extract video features and intention features, based on artificial intelligence (AI). The AI may include, for example, an artificial neural network model that mimics brain neurons.

The video clip collector 130 collects target clips into which the source video is split, based on the video features and the intention features, and the video generator 140 generates a target video by using the target clips.

Because the video generation apparatus 100 generates the target video by using the intention features extracted from the video generation request, generation of a target video that satisfies user's needs is possible compared with existing video generation methods not considering user's requirements.

Figure 2:
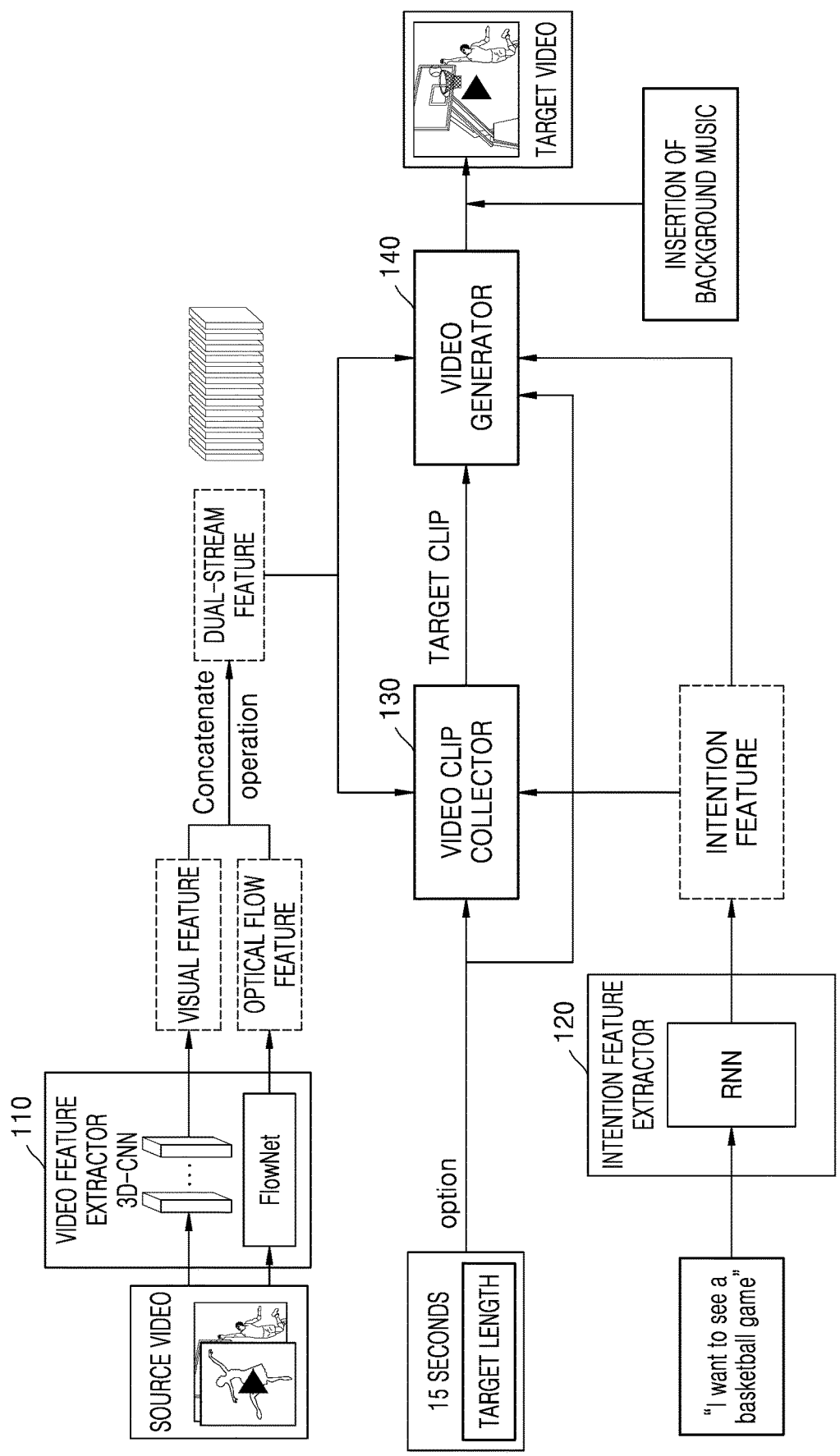
FIG. 2 is a flowchart of a video generation method performed by a video generation apparatus according to an embodiment.

FIG. 2 is a flowchart of a video generation method performed by the video generation apparatus 100, according to an embodiment.

Referring to FIG. 2, the video generation apparatus 100 receives a plurality of source videos and a video generation request of a user and outputs a target video.

At least some of the plurality of source videos may be source videos stored in the video generation apparatus 100 or stored in an external device (e.g., a server).

The video generation request may include a target length of the target video that the user want to generate (that is, 15 seconds shown in FIG. 2), and a user intention (e.g., "I want to see a basketball game").

According to an embodiment, the user may make the video generation request in various ways. For example, the user may make the video generation request through a voice instruction or through a text input.

When the video generation request from the user is initiated, the video generation apparatus 100 may display a personalized information configuration interface for the target video. The user can input, for example, the target length of the target video, for what person a video is desired to be generated, and for what action a video is desired to be generated, through an interface.

When the user wants to generate a video with respect to a certain person, the user can input a gender, an age, or other properties of the person through an interface. For example, the user may input an image of the person through an interface. When the video generation apparatus 100 generates the target video, the video generation apparatus 100 may perform face recognition on the image provided by the user, and generate a target video including a person of the recognized face. Only video clips including the certain person within the source videos may be used as target clips for generating the target video.

Video features of the source videos and intention features of an intention of the video generation request are extracted according to the video generation request of the user.

According to an embodiment, the video features include visual features and optical flow features. As shown in FIG. 2, a three-dimensional convolutional neural network (3D-CNN) may be used to extract a visual feature (also referred to as a visual feature map). An output tensor of the 3D-CNN is recorded as L*H*W*C, where L represents the number of frames in a source video, H and W represent a height and width of an output feature map, respectively, and C represents the number of output channels, which is the number of output feature maps.

According to an embodiment, an optical flow feature (also referred to as an optical flow feature map) may be extracted using Flownet. An output tensor of Flownet is recorded as L*H*W*2. L, H, and W represent the number of frames in the source video and a height and width of the output feature map (i.e., an optical flow feature map), respectively, and 2 represents the number of output channels. Since the optical flow feature is information used to reflect a change in the positions of pixels in two adjacent frames of a source image, the number of optical flow feature maps is 2. The values of the same point in the two output feature maps reflect pixel displacement at this point.

The image sizes of an optical flow feature map and a visual feature map may be the same as each other or different from each other. When the image sizes are different from each other, at least one of the optical flow feature map and the visual feature map may be processed by upsampling and/or downsampling in order to fuse (or concatenate) the two types of visual feature maps, and accordingly two feature maps of the same size may be obtained. Features (also referred to as dual-stream features) in which the optical flow feature map and the visual feature map are fused may be used in a subsequent process.

According to an embodiment, the height and width of the visual feature map and the optical flow feature map may be the same as those of frames within the source video, respectively.

The intention feature from the video generation request of the user may be extracted through a recurrent neural network (RNN). In detail, the video generation request may be input the RNN, and the intention feature corresponding to the video generation request may be output from the RNN. The intention feature may be a feature vector with a preset dimension, such as a 256-dimensional feature vector.

According to an embodiment, the video clip collector 130 performs a function of collecting video clips, and the video generator 140 performs a function of generating a target video.

As shown in FIG. 2, the video clip collector 130 obtains a target clip from the source video. The target clip refers to a clip that is input to an attention-based LSTM decoder network which will be described later, in order to generate the target video. Clips into which the source video is split through person recognition or action recognition which will be described later, or clips selected through filtering after being split from the source video may be the target clip.

The video generator 140 generates the target video by using at least some of the target clips. When the target video is generated based on the target clips, a background music of a video may be added. The background music may be selected by the user or may be previously selected. Alternatively, the background music may be selected from candidate background music according to the user's intention or a relation with the target video. For example, a background music that matches with the contents of the target clips may be selected to generate the target video.

The video clip collection and the generation of the target video will be described in detail below.

1. Video Clip Collection Based on Video Understanding

A user generally shoots a video based on a person's activities. In other words, a person and a person's action are the most critical semantic information in a video. In the related art, a source video is split according to a simple rule in order to generate a target video, and the meaning of source videos are not analyzed. In other words, semantic information about a person and an action is not extracted from a source video.

According to an embodiment, semantic information about the persons and actions of many source videos is fully considered and analyzed. Based on a hierarchical action recognition method and person understanding processing, detailed semantic information about persons and actions in video clips, for example, somebody doing something, may be ascertained, and may be analyzed in conjunction with the user's intention. Thus, a target clip that the user wants may be obtained.

Figure 3:
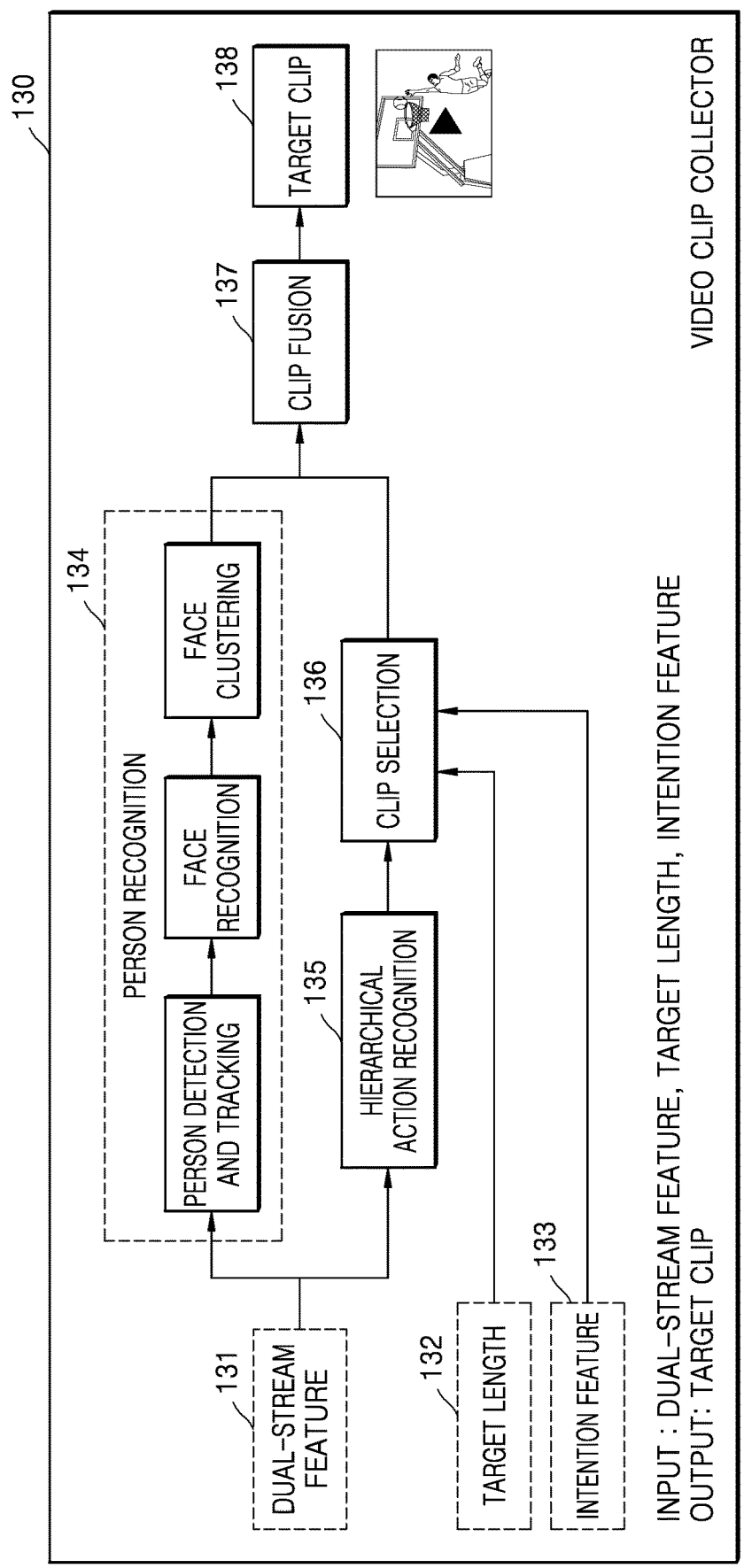
FIG. 3 is a flowchart of an operation of a video clip collector according to an embodiment.

A process performed by the video clip collector 130 of FIG. 2 is shown in FIG. 3.

FIG. 3 is a flowchart of an operation of the video clip collector 130, according to an embodiment.

An input of the video clip collector 130 may include the dual-stream feature 131, the intention feature 133, and the target length 132 which is the length of the target video. The target length may be optional. When the target length is not input by the user, a preset length may be used as the target length, or the target length may not be considered.

As shown in FIG. 3, the process performed by the video clip collector 130 may mainly include three sub-processes. One sub-process 134 is used to obtain a person clip including a person. Another sub-process 135, 136 is used to analyze an action (hierarchical action recognition 135 shown in FIG. 3) and obtain an action clip based on a result of the analysis.

When the person clip and the action clip respectively obtained through the two above-described sub-processes include a common part, a target clip 138 may be determined based on a clip corresponding to a result of fusion 137 between the person clip and the action clip. For example, when the person clip and the action clip are included in the same source video, the person clip and the action clip included in the same source video are fused, and the target video may be generated based on a fusion-processed video clip.

The content of each part shown in FIG. 3 will be described in detail below. It should be noted that reference numerals in the description below are not used to limit the order of implementation of each part, but used to facilitate description of each part. In actual applications, the order of implementations of respective parts may be variously configured according to actual requirements.

1.1 Person Recognition

Figure 4:
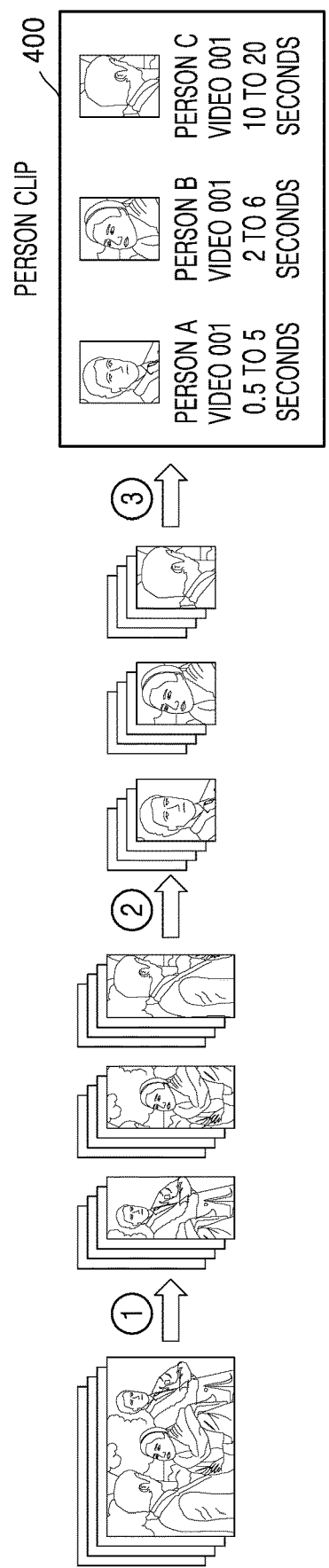
FIG. 4 is a flowchart of a method, performed by a video clip collector according to an embodiment, of collecting a person clip.

FIG. 4 is a schematic flowchart of obtaining a video clip containing a person (also referred to as a person clip 400), based on person recognition.

As shown in operations ①, ② and ③ of FIG. 4, a person recognition process includes the following three parts. Detailed descriptions of the three parts will now be given.

① Person detection and tracking: it may be implemented using a person detection and tracking algorithm. An input is a dual-stream feature of a video source, and an output may include a person trajectory (such as, position information of a person in a frame).

② Face recognition: for each person trajectory, a face recognition algorithm may be used for face feature extraction and identity confirmation.

③ Face clustering: a face clustering algorithm may be used to cluster each person trajectory according to a result of the face recognition and give unique person IDs to all appearing people. Video clips of all people in the source video may be obtained after the face clustering.

In the example shown in FIG. 4, for a source video (video 001 of FIG. 4, where 001 is the identifier of the source video), it may be recognized that the video 001 contains 3 persons, namely, person A, person B, and person C, and 3 person clips, namely, a clip containing person A for 0.5 to 5 seconds, a clip containing person B for 2 to 6 seconds, and a clip containing person C for 10 to 20 seconds, may be obtained from video 001.

1.2 Hierarchical Action Recognition

According to an embodiment, the video generation apparatus 100 splits the source video into action clips and identifies respective levels of the action clips. When a target length is input by a user, the input target length may be used to filter the action clips.

Figure 5:
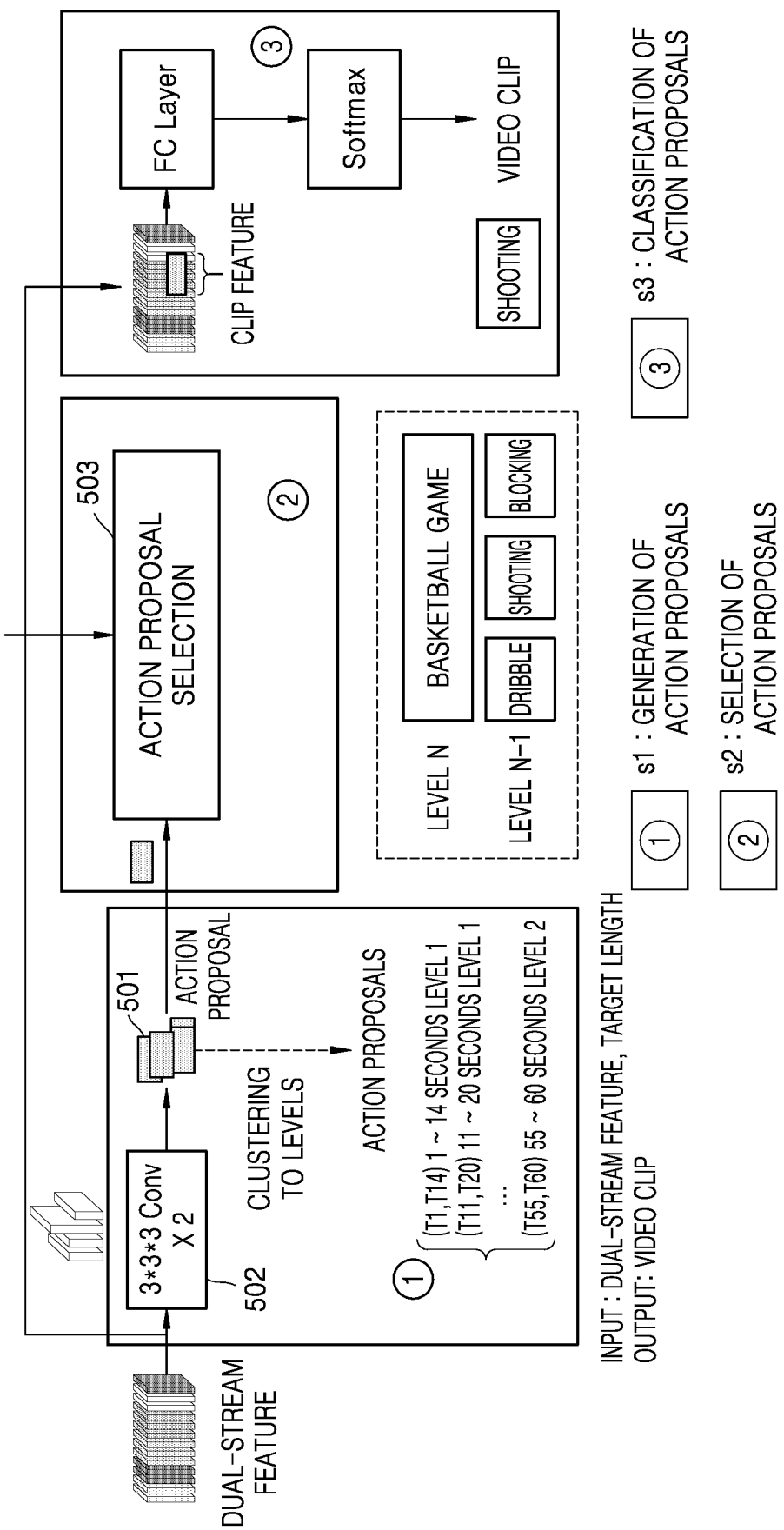
FIG. 5 is a flowchart of a method, performed by a video clip collector according to an embodiment, of collecting an action clip.

FIG. 5 is a schematic flowchart of hierarchical action recognition.

As shown in FIG. 5, an input may include a dual-stream feature and a target length, and an output is a result of classification of action types of at least some of action clips. Hierarchical action recognition may include three operations, as shown in FIG. 5.

Operation ① is S1 shown in FIG. 5. In operation ①, action proposals 501 are generated. Each action proposal may include period information of a video clip identified as including an action in a source video.

The purpose of operation ① is to generate a large amount of period information associated with the action proposals, based on dual-stream features. In detail, each action proposal may include a start time of an action and an end time thereof. When an action proposal is P1 (1 to 14 seconds), the start time of the action proposal is one second of the source video and the end time thereof is 14 seconds of the source video. The action proposal indicates that there is likely to be an action in a video clip of 1 second to 14 seconds in the source video, and the time length of the video clip is 14 seconds.

In the example shown in FIG. 5, each of the action proposals is assumed to be directly expressed by the start time and the end time. As shown in FIG. 5, an action proposal is expressed as (T1, T14), where T may be understood as time and the numbers indicate the start time and the end time, namely, the start time of the action proposal being one second of the source video and the end time thereof being 14 seconds of the source video.

Generation of the action proposals may be realized by a neural network. The neural network is trained using a large number of video samples so that the neural network may generate the action proposals corresponding to action clips in the source video, based on the features of the source video (such as, dual-stream features).

In detail, additional extraction of action proposal features (i.e., features used to generate an action proposal) may be performed on the dual-stream features of the source video obtained by the video feature extractor 110. A plurality of action proposals may be generated according to extracted action proposal features. For example, when the dual-stream features of the source video are input to a 3D convolutional network 502 containing 2 layers of convolution kernels 3*3*3, deeper action proposal features may be extracted through the 3D convolutional network. The action proposal features may be generated according to an existing method for generating an action proposal.

The action proposals are classified into different levels according to the time lengths thereof. In general, a higher level, for example, level 1, is allocated for action proposals with longer lengths.

For the level determination of the action proposal, an embodiment of the disclosure provides two optional level determination methods. One method is a strategy with higher accuracy and better performance (hereinafter, referred to as strategy J1), and the other method is a strategy with a fast operation speed and low resource consumption (hereinafter, referred to as a strategy J2). The level determination based on these two strategies will be described below with reference to FIG. 5.

a. Strategy J1

According to an embodiment, it is assumed that five action proposals are generated based on the dual-stream features of the source video. The five action proposals are P1 (1 to 14 s), P2 (2 to 8 s), P3 (3 to 8 s), P4 (11 to 20 s), and P5 (21 to 25 s), respectively, where s indicates the unit of second and the two numbers in parentheses indicate the start time and end time of an action clip corresponding to each action proposal. The time lengths of the five action proposals are 13 seconds, 6 seconds, 5 seconds, 9 seconds, and 4 seconds, respectively. The five action proposals are used as examples for explanation.

A length threshold and a length region corresponding to each level may be obtained according to experience and statistical analysis based on a large amount of training data (that is, a training sample, specifically a sample video). In detail, according to experience and statistics, within a certain error range, action clips of different levels in the training data may be considered to follow the Gaussian distribution of time lengths, and length regions respectively corresponding to the levels (e.g., [mean−N*deviation, mean+N*deviation]) may be used to determine a level corresponding to each action proposal. Here, mean is the average value of the Gaussian distribution and deviation is a standard deviation.

For level 1, the length region may be determined according to the mean and deviation of the Gaussian distribution corresponding to action clips belonging to this level. Here, N is a value set in advance according to requirements, and may be a positive number. The value N may be determined as various values according to implementation methods. For example, N may be 3. When N is 3, respective length regions of the levels may cover 99.7% of the training sample. In other words, the time lengths of the action proposals of 99.7% of the training samples may fall within the time regions of the levels determined based on the N values.

Figure 6:
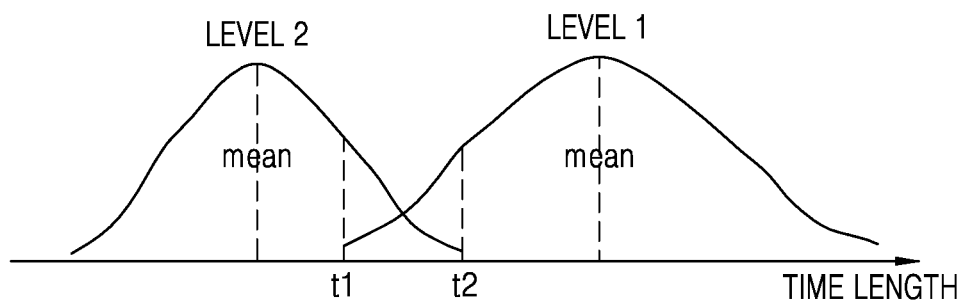
FIG. 6 is a schematic diagram of a Gaussian distribution over a time length corresponding to two levels.

FIG. 6 is a schematic diagram of the Gaussian distribution over the time length corresponding to two levels, namely, level 1 and level 2 (level 1 is higher than level 2). In FIG. 6, a length region [t1, t2] is a transition length region of level 1 and level 2. For each action proposal, a level may be determined based on a time length corresponding to the action proposal and a length region corresponding to each level.

In detail, assuming that the time length of an action proposal (that is, the length of an action clip corresponding to an action proposal) is t, the level of the action proposal may be determined by comparing respective length regions of levels [mean−N*deviation, mean+N*deviation] with the time length t of the action proposal.

As shown in FIG. 6, t1 is the left boundary of a time region corresponding to level 1 and t2 is the right boundary of a time region corresponding to level 2. t1 may have a value corresponding to a mean+N*deviation of level 2, and t2 may have a value corresponding to mean−N*deviation of level 1.

When t<t1, the level of the action proposal is 2, and, when t>t2, the level of the action proposal is 1. When t falls within a region between t1 and t2, the action proposal belongs to both level 1 and level 2.

For the five action proposals, namely, P1 (1 to 14 s), P2 (2 to 8 s), P3 (3 to 8 s), P4 (11 to 20 s), and P5 (21 to 25 s), time lengths of action clips are 13 seconds, 6 seconds, 5 seconds, 9 seconds, and 4 seconds, respectively. When t1 is 4.5 seconds and t2 is 7 seconds and strategy J1 is applied, the action proposals P1 and P4 may belong to level 1, P5 may belong to level 2, and P2 and P3 may belong to level 1 and level 2. For the action proposals shown in FIG. 5, when strategy J1 is applied, an action proposal (T1, T14) corresponding to a length of 14 seconds corresponds to level 1, and an action proposal (T55, T60) corresponding to a length of 5 seconds corresponds to level 2.

B. Strategy J2

Compared with strategy J1, strategy J2 provides simple calculation and consumes less device resources during calculation. Accordingly, strategy J2 is suitable for scenarios that are sensitive to operating time. For strategy J2, average lengths of action clips according to different levels in the training data may be calculated and may be used as length thresholds of the levels. When determining the level of each action proposal, the time length of the action proposal may be compared with the length threshold length of each level, and a level of which the length threshold is closest to the time length of the action proposal may be selected as the level of the action proposal.

When the two levels shown in FIG. 6 are taken as an example and the time lengths of two different action proposals are t1 and t2, respectively, because t1 is closest to the length threshold (mean) of level 2, the level of an action proposal corresponding to t1 is level 2. Similarly, because t2 is closest to the length threshold (mean) of level 1, the level of an action proposal corresponding to t2 is level 1.

When strategy J2 is applied and the length threshold of level 1 is 10 seconds and the length threshold of level 2 is 5 seconds, for the aforementioned action proposals of 13 seconds, 6 seconds, 5 seconds, 9 seconds, and 4 seconds, each of the time lengths of the action proposals P1 and P4 is closest to 10 seconds from among 10 seconds and 5 seconds and thus level 1 may be allocated to the action proposals P1 and P4, and each of the lengths of the action proposals P2, P3, and P5 is closest to 5 seconds from among 10 seconds and 5 seconds and thus level 2 may be allocated to the action proposals P2, P3, and P5.

After determining the level of each action proposal, the process may proceed to operation ②.

Operation ② is S2 shown in FIG. 5. In S2, action clips of at least some of the action clips are selected through action proposal selection 503 for operation ③.

In operation ①, many action proposals may be generated. In order to reduce a calculation amount and improve accuracy, only some actions proposal may be selected for operation ③.

Figure 7:
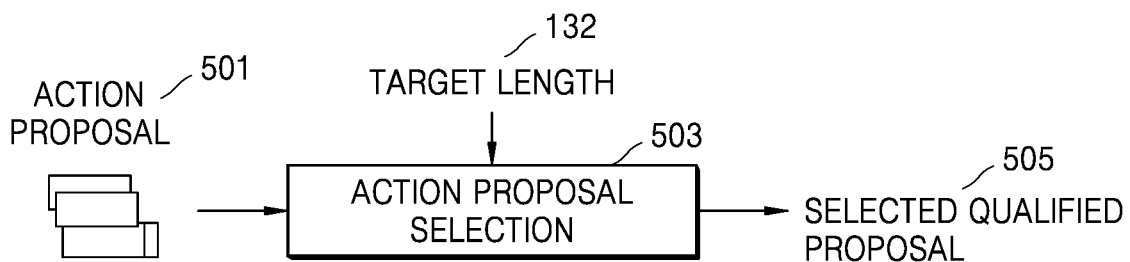
FIG. 7 is a schematic flowchart of a process of filtering action proposals obtained through action recognition.

As shown in FIG. 7, operation ② is used to select suitable action proposals 505. To this end, a target level is determined, and action clips belonging to the target level are selected for operation ③.

The target level may be adaptively determined according to the target length 132 of the target video that the user wishes to generate finally. When the user does not specify the target length, the target length may be considered to be infinite. In this case, the action proposals generated in operation ① may be all used in operation ③.

According to embodiments, when the user does not specify the target length, a pre-determined length may be used to determine a target level. The pre-determined length may be selected according to the scene of the target video that the user wishes to generate.

In response to operation ①, operation ② proposes two strategies referred to as strategy Z1 and strategy Z2.

a. Strategy Z1

Strategy Z1 is a strategy corresponding to strategy J1. The aforementioned five action proposals P1 (1~14 s), P2 (2~8 s), P3 (3~8 s), P4 (11~20 s), and P5 (21~25 s) are used as examples for illustration. Based on strategy J1, levels are allocated for action proposals. In detail, level 1 is allocated for P1 (1~14 s), level 1 and level 2 are allocated for P2 (2~8 s), level 1 and level 2 are allocated for P3 (3~8 s), level 1 is allocated for P4 (11~20 s), and level 2 is allocated for P5 (21~25 s).

Assuming that the target length is T', a limited length of each video clip may be obtained based on an adjustment factor n. For example, a limited length T of a video clip may be T'/n. Here, n may be an integer equal to or greater than 1. According to source video lengths, a value ranging from 2 to 5 may be empirically used as n. For convenience of explanation, it is assumed that n is 2. It is also assumed that the average length of level 1 is 10 seconds and the average length of level 2 is 5 seconds.

When determining a target level, T is compared with the average length of level 1 starting from level 1. Assuming that a user wants to generate a video with a length of 30 seconds, the limited length T of each video clip is 15 seconds, which is greater than 10 seconds as the average length of level 1. In this case, level 1 is selected as the target level. The action proposals determined as level in operation ① are selected for operation ③, and the present process is concluded.

Figure 8:
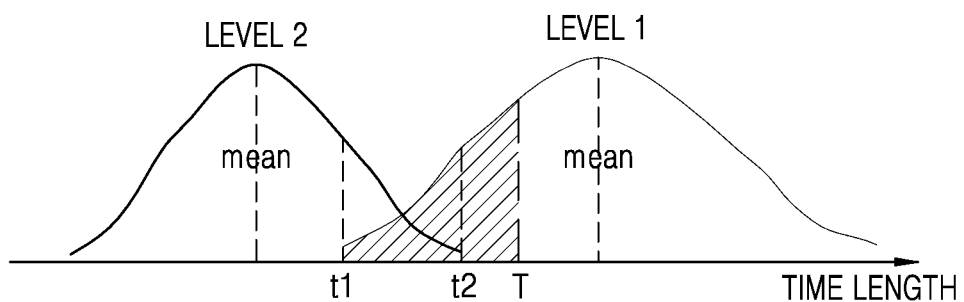
FIG. 8 is a diagram for explaining a principle of filtering action proposals.

When the user wants to generate a video with a length of 18 seconds, the limited length T is 9 seconds. 9 seconds are less than 10 seconds but are greater than the average length of level 2. In this case, the number N1 of action proposals with a time length less than T, namely, the number of action proposals belonging to a shaded region of FIG. 8, from among the action proposals allocated with level 1, may be compared with the number N2 of action proposals with a time length less than T from among the action proposals allocated with level 2.

When N1>N2, level 1 is selected as the target level. In this case, it is guaranteed that enough action proposals that satisfy the target length from among the action proposals corresponding to level 1 may be provided.

When N1<N2, level 2 is selected as the target level.

When there are more than two levels, the above-described method may be expanded in the following way. For example, when 3 levels are included and the number of action proposals with a time length less than T from among the action proposals corresponding to level 1 is less than the number of action proposals with a time length less than T from among the action proposals corresponding to level 2, the target level is determined from among level 2 and level 3. In other words, level 2 or level 3 is determined as the target level according to a result of comparing the number of action proposals with a time length less than T from among the action proposals corresponding to level 2 with the number of action proposals with a time length less than T from among the action proposals corresponding to level 3.

Once the target level is determined, a final level of an action proposal belonging to a transition length region and being assigned the target level is determined as the target level. In other words, when the time length of action proposals falls within the transition length region, one of the two levels corresponding to the transition length region is determined as the target level, and the time length of the action proposals is less than the limited length T, the action proposals may be used as action proposals corresponding to the target level. For example, when the aforementioned level 1 is selected as the target level, action proposals located within a transition length region [t1, t2] belonging to both level 1 and level 2 may be finally assigned level 1.

Regarding strategies J1 and Z1, an embodiment of the disclosure uses the Gaussian distribution to fit training data of different levels, and uses a region for determining levels (i.e., a length region [mean−N*deviation, mean+N*deviation]). In actual applications, when a smaller N (such as, 0.5) is selected, the levels of the action proposals may tend to be concentrated. In other words, because the range of the length region becomes smaller, only the action proposals with lengths that are very close to the average length of levels are designated with corresponding levels. According to this method, levels may be more strictly divided, and the amount of data to be subsequently processed may be reduced by decreasing the number of action proposals corresponding to the levels. In addition, subsequent processing may be promoted, and classification accuracy may be improved. When it is necessary to consider the diversity of action clips, a larger N (such as, 5) may be used. In this case, more action proposals may fall within the transition length region, and thus multiple levels may be allocated for multiple action proposals. According to this method, the number of action proposals selected for the next operation may be increased, and the content of a video clip may be more abundant. In practical applications, the value of N may be determined in various ways.

B. Strategy Z2

Strategy Z2 is a strategy corresponding to strategy J2. When strategy J2 is applied for the above-described action proposals P1 through P5, the action proposals P1 and P4 are assigned as level 1, and the action proposals P2, P3 and P5 are assigned as level 2.

Figure 9:
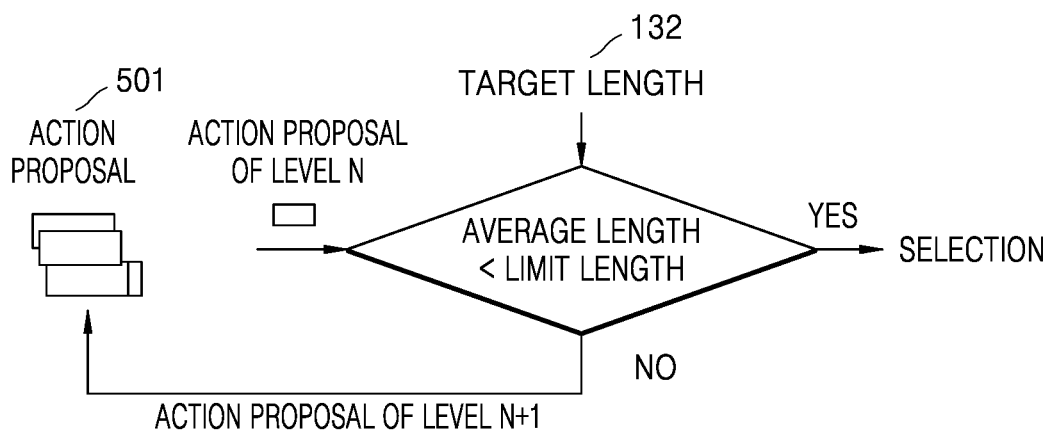
FIG. 9 is a diagram for explaining a principle of filtering action proposals.

FIG. 9 illustrates a target level selection process based on strategy Z2. Two levels, namely, the aforementioned levels 1 and 2, are used as an example for illustration.

The average length of each level and the limited length T are compared with each other, starting from level 1.

When the average length of a current level is less than the limited length T, the current level is selected as the target level. For example, when the average length of level 1 is 10 seconds and the limited length is 15 seconds, level 1 is selected as the target level, the action proposals P1 and P4 belonging to the target level are selected for operation ③, and operation ② is concluded.

When the average length of the current level is greater than the limited length T, the average length of each level is compared with the limited length T until the average length of a level is less than the limited length T. For example, when the limited length T is 7 seconds and the average length of level 1 is greater than 7 seconds, the limited length T is compared with the average length of level 2. When the average length of level 2 is 5 seconds smaller than 7 seconds, the target level is determined as level 2, and the action proposals P2, P3, and P5 of level 2 are selected for operation ③, and operation ② is concluded.

Operation ③ is operation S3 shown in FIG. 5.

The purpose of operation ③ is to determine respective action types of the action proposals selected in operation ②. In detail, a clip feature of an action proposal (that is, a feature of an action clip corresponding to the action proposal) is transmitted to a full connected (FC) layer, and an output feature vector is obtained based on the network parameters (e.g., weights and bias) of the FC layer.

According to an embodiment, the FC layer calculates a weight*clip feature+bias, and feature vectors output by the FC layer are classified by a Softmax layer to obtain an action classification result corresponding to the action proposal. In detail, an output of the Softmax layer may be a label of a specific action classification result, that is, a label of a specific action type or a classification result vector. The vector is a one-dimensional column vector, the number of elements in the vector is equal to the number of all action types, and the value of each element in the vector may be the probability that an action proposal corresponds to each action type.

For an action proposal, according to the start and end time of the action proposal, the clip features of the action clips corresponding to the action proposal may be obtained from dual-stream features. For example, a feature (features shown in FIG. 5) corresponding to the time length of the action proposal from among the dual-stream features may be obtained as a clip feature of the action clip.

The clip features may be expressed as P*H*W*C. Here, P, H, W, and C are the number of frames, the height of a feature map, the width of the feature map, and the number of feature maps contained in the action clip. According to the start and end time of an action, an action clip in a source video may be captured, and feature extraction of the action clip may be performed.

For the aforementioned levels 1 and 2, when it is assumed in operation ② that an action proposal of level 1 is selected, action types of the action proposals corresponding to level 1 may be classified by using clip features. For example, P1 may be classified as "basketball game" and P4 may be classified as "swimming". In the same way, when it is assumed in operation ② that an action proposal of level 2 is selected, action types of the action proposals corresponding to level 2 may be classified by using clip features. For example, P2 may be classified as "floating" and P3 may be classified as "dribble", and P5 may be classified as "shooting".

In operation ③, only the action proposals selected in operation ② may be classified. For example, when P1 and P4 of level 1 are selected in operation ②, the action types of P1 and P4 may be classified, and P2, P3, and P5 may be ignored, in operation ③.

According to an embodiment, action types for action proposals may have a hierarchical structure according to the levels of the action proposals. For example, the action types corresponding to level 1 may be superordinate to the action types corresponding to level 2. In detail, the action proposals corresponding to level 1 are able to be classified into "baseball game", "swimming", or the like, the action proposals corresponding to level 2 may be classified into "shooting", "dribble", "blocking", or the like, which are subordinate to "basketball game", or may be classified into "freestyle", "backstroke", "breaststroke", or the like, which are subordinate to "swimming". Being superordinate and being subordinate indicate inclusion relationships in a specific category. In other words, being superordinate in a specific category may include several subordinate concepts in the same category.

Figure 10:
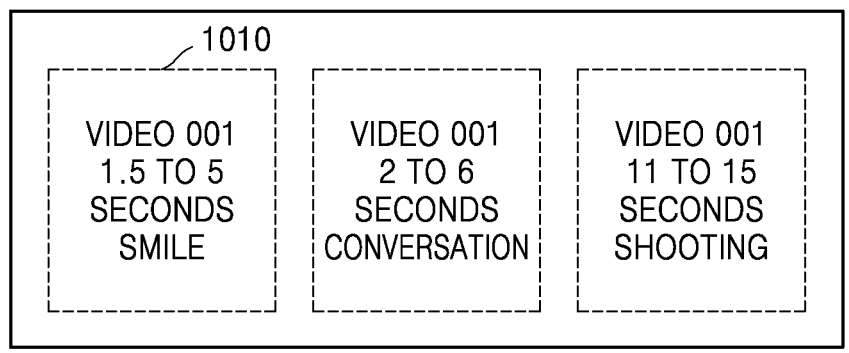
FIG. 10 is a block diagram illustrating information related to an action clip.

Based on a hierarchical action recognition method according to an embodiment, action clips with different levels may be obtained, some of the action clips may be selected according to target lengths, and action types corresponding to the selected action clips may be determined. For example, for video 001, information of action clips of which action types are classified may include information shown in FIG. 10. As shown in FIG. 10, time information of a first action clip 1010 includes a start time of 1.5 seconds and an end time of 5 seconds, and the action type of the first action clip 1010 may be "smile".

1.3 Clip Selection

The purpose of section 1.3 is to filter action clips, based on a user's intention, namely, intention features. Person clips and/or action clips obtained in previous sections 1.1 and 1.2 are filtered, and thus target clips are obtained.

In the flowchart of FIG. 3, the clip selection is used to filter respective action clips. However, according to embodiments, the clip selection may be used to filter person clips and/or action clips. The following uses the action candidate video clips as an example for description.

Correlation (also referred to as a correlation value) of two vectors may measure similarity between vectors. The greater the correlation is, the more similar the two vectors is. Therefore, clip filtering may be performed by calculating correlation between the intention features and the respective clip features of the action clips.

Figure 11:
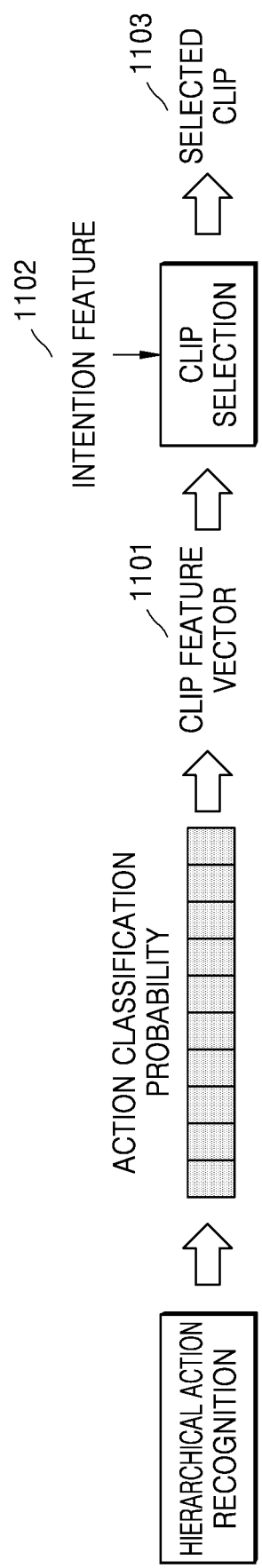
FIG. 11 is a flowchart of a process of selecting a target clip from among action clips, based on an intention feature.

FIG. 11 is a diagram for explaining the principle of clip selection.

As shown in FIG. 11, the video generation apparatus 100 calculates correlation between the clip features (clip feature vector 1101 shown in FIG. 11) of action clips corresponding to the action proposals that belong to the target level and the intention features 1102, and uses the action clips corresponding to a higher correlation as target clips 1103.

According to an embodiment, the clip features of the action clips may be obtained using the start time and end time corresponding to action proposals. Alternatively, the clip features of the action clips may be features corresponding to the time lengths of the action clips from among the dual-stream features of a source video, or may be features obtained via feature re-extraction of the action clips. Alternatively, the clip features of the action clips may be features corresponding to the time intervals of the action clips from among the dual-stream features of the source video, or may be features obtained after feature conversion is performed with respect to the features obtained via feature re-extraction of the action clips.

Alternatively, according to an embodiment, the clip features of the action clips may be the feature vectors output by the FC layer when the action type classification is performed, or may be the classification result vector output by the Softmax layer.

A method of selecting the target clips will now be described in detail.

a. Correlation Calculation

In general, it is determined whether a clip is related to the user's intention, by calculating the similarity between the clip feature vector and the intention feature vector. Each of the clip feature vector and the intention feature vector may be a one-dimensional feature vector.

According to an embodiment, the correlation between the intention features and the clip features may be implemented based on the correlation calculation model of an attention mechanism. In detail, the correlation may be calculated using Equation 1:

$$c(f_v, f_{intention}) = v^T \tan h(Wf_v + Vf_{intention} + b) \quad \text{[Equation 1]}$$

where $f_v$ indicates the clip features of the action clips and $f_{intention}$ indicates the intention features. In Equation 1, $c(f_v, f_{intention})$ indicates a correlation between $f_v$ and $f_{intention}$. In Equation 1, W is a conversion parameter of $f_v$, and V is a conversion parameter of $f_{intention}$. In Equation 1, b is a bias vector, and $v^T$ is a weight matrix of features. In Equation 1, Tan h is an activation function which is used for normalization of a feature vector, and is used to normalize the feature vector to (−1,1).

In Equation 1, W, V, b, and $v^T$ are network parameters of the correlation calculation model based on the attention mechanism, which may be obtained through model training. In Equation 1, W and V are used to convert the clip features and the intention features to the same feature space, respectively, and $v^T$ is used to transform the dimension of the normalized feature vector to a specified dimension. The correlation calculation method based on Equation 1 will now be described in detail.

Figure 12:
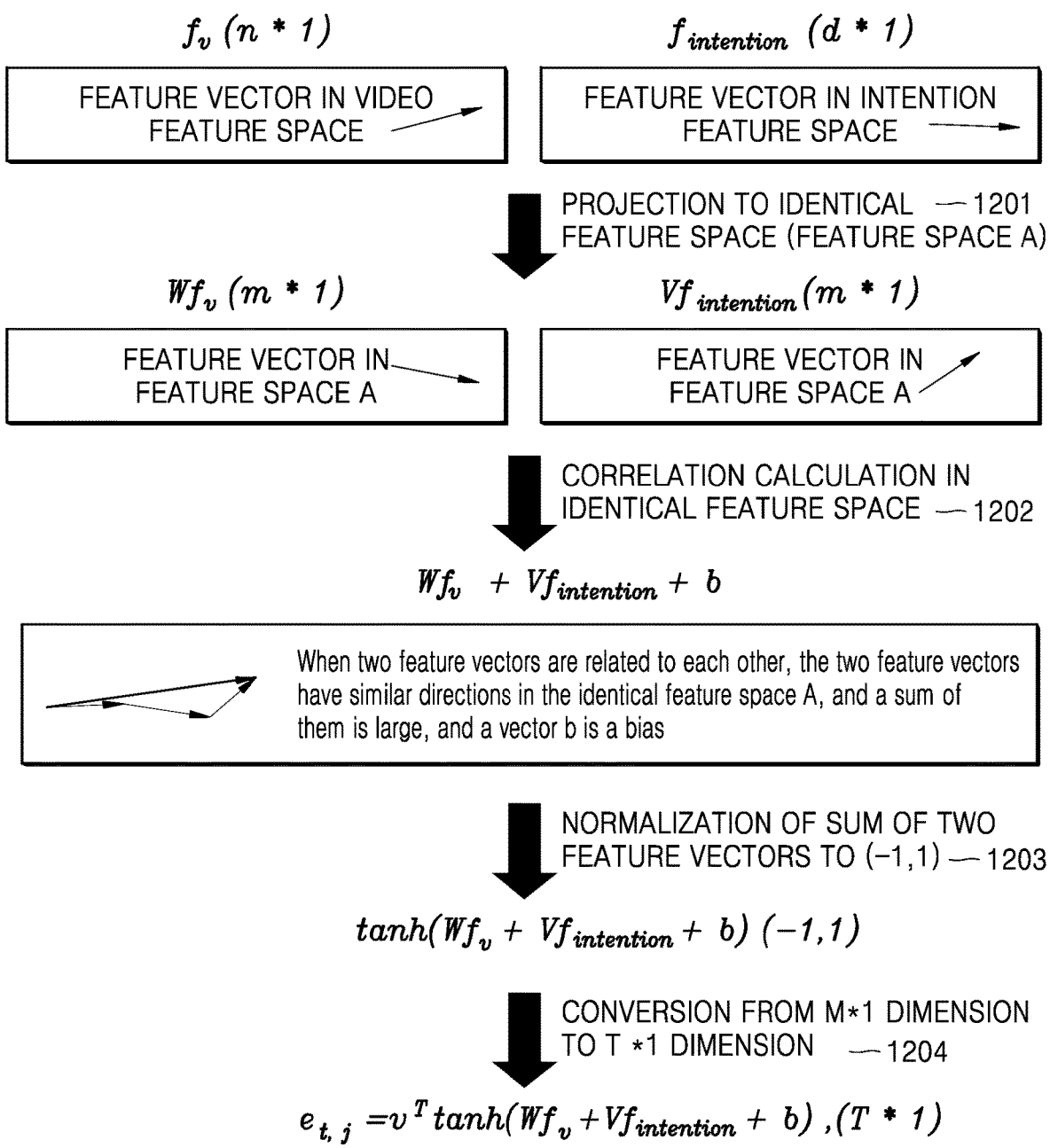
FIG. 12 is a schematic flowchart of a correlation calculation method.

FIG. 12 is a schematic flowchart of the correlation calculation method.

Because the intention features are in an intention feature space and the clip features are in a visual feature space, the correlation may not be directly calculated for the vectors in different spaces. Therefore, in order to calculate the correlation, the clip features and the intention features need to be projected to the same feature space.

As shown in FIG. 12, the feature vector of an action clip is n*1 dimension. In other words, the feature vector of an action clip is an n-dimensional column vector corresponding to $f_v(n*1)$. The feature vector of the intention features is a feature vector of d*1 dimension, and is a d-dimensional column vector corresponding to $f_{intention}(d*1)$ shown in FIG. 12.

The arrows in FIG. 12 respectively indicate the direction vectors of feature vectors. In 1201, through a conversion parameter matrix, $f_v(n*1)$ and $f_{intention}(d*1)$ are projected to an identical feature space A. In other words, $f_v(n*1)$ corresponds to a feature vector $Wf_v(m*1)$ in a feature space A, and $f_{intention}(d*1)$ corresponds to a feature vector $Vf_{intention}(m*1)$ in the feature space A. The projected feature vectors are all m-dimensional column vectors. In detail, W is an m*n matrix, namely, a parameter matrix of m rows and n columns, and $f_v(n*1)$ is a matrix of n rows and one column. The two matrices are multiplied to obtain a new matrix of m rows and one column, namely, $Wf_v(m*1)$. Similarly, V is an m*d matrix, and is multiplied by $f_{intention}(d*1)$ to obtain a matrix of m rows and one column, namely, $Vf_{intention}(m*1)$.

In 1202, an initial correlation between two projected feature vectors may be calculated in the identical feature space A. When a correlation between two feature vectors is high, the two feature vectors need to have similar directions in the same feature space, and a sum of the two feature vectors needs to be large. On the other hand, when the correlation between two feature vectors is low, directions of the two feature vectors in the same feature space greatly differ, and a sum of the two feature vectors needs to be small. Therefore, the correlation between the two vectors may be characterized by the sum of the two feature vectors.

Figure 13:
FIG. 13 is a diagram illustrating a correlation between feature vectors.
Figure 14:
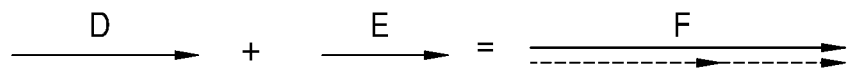
FIG. 14 is a diagram illustrating a correlation between feature vectors.

As shown in FIGS. 13 and 14, a sum of vectors A and B is a vector C, and a sum of vectors D and E is a vector F. The directions of the vector D and the vector E are the same, and a difference between the directions of the vector A and the vector B is large. Therefore, the magnitude of the vector F is larger than the magnitude of the vector C, and the correlation between the vector D and the vector E is greater than the correlation between the vector A and the vector B.

For example, it is assumed that a user wants to generate a video about swimming. One video clip 1 is a video clip about freestyle swimming, and another video clip 2 is a video clip about a basketball game. The length of a sum of the vector of a user intention feature projected into the same feature space and the vector of the clip feature of the video clip 1 is greater than the length of a sum of the vector of the user intention feature projected into the same feature space and the vector of the clip feature of the video clip 2.

Accordingly, a correlation between the feature vectors $Wf_v(m*1)$ and $Vf_{intention}(m*1)$ may be calculated by $Wf_v + Vf_{intention} + b$. Here, a feature vector b, that is, a bias b, is an offset. This makes Equation 1 more robust in extreme situations such as a case where $Wf_v + Vf_{intention}$ is 0. $Wf_v + Vf_{intention} + b$ represents summing of the two feature vectors $Wf_v(m*1)$ and $Vf_{intention}(m*1)$ and adding the feature vector b to a result of the summation, in order to obtain a new m-dimensional column vector. $Wf_v + Vf_{intention} + b$ may be understood as a correlation vector between the clip feature vector and the intention feature vector.

Further, because a sum of the feature vectors varies widely, it is difficult for a network model to be trained. Therefore, in 1203, the sum of the feature vectors may be normalized to (−1,1). For example, the sum of the feature vectors may be normalized by using the aforementioned activation function, namely, the tan h function. After being normalized to (−1, 1), in 1204, a normalized m-dimensional column vector $\tanh(Wf_v + Vf_{intention} + b)$ may be changed to a T-dimensional column vector through a weight matrix $v^T$. In detail, $v^T$ is a matrix of T*m, namely, a matrix of T rows and m columns. A result of calculation of the correlation, namely, $v^T \tanh(Wf_v + Vf_{intention} + b)$, which is a T-dimensional column vector as a matrix of T*1, may be obtained by multiplying the two matrices.

Optionally, for the convenience of calculation, the value of T may be 1, and $c(f_v, f_{intention})$ may be a numerical value. When the value of T is an integer greater than 1, $c(f_v, f_{intention})$ is a column vector. As another optional manner, a calculation result of $\tanh(Wf_v + Vf_{intention} + b)$ may be directly used as $c(f_v, f_{intention})$.

b. Selection of Action Clips Related to User Intention

After a correlation corresponding to each action clip is obtained in operation a, an action clip with a correlation greater than a preset threshold may be selected as a video clip.

Figure 15:
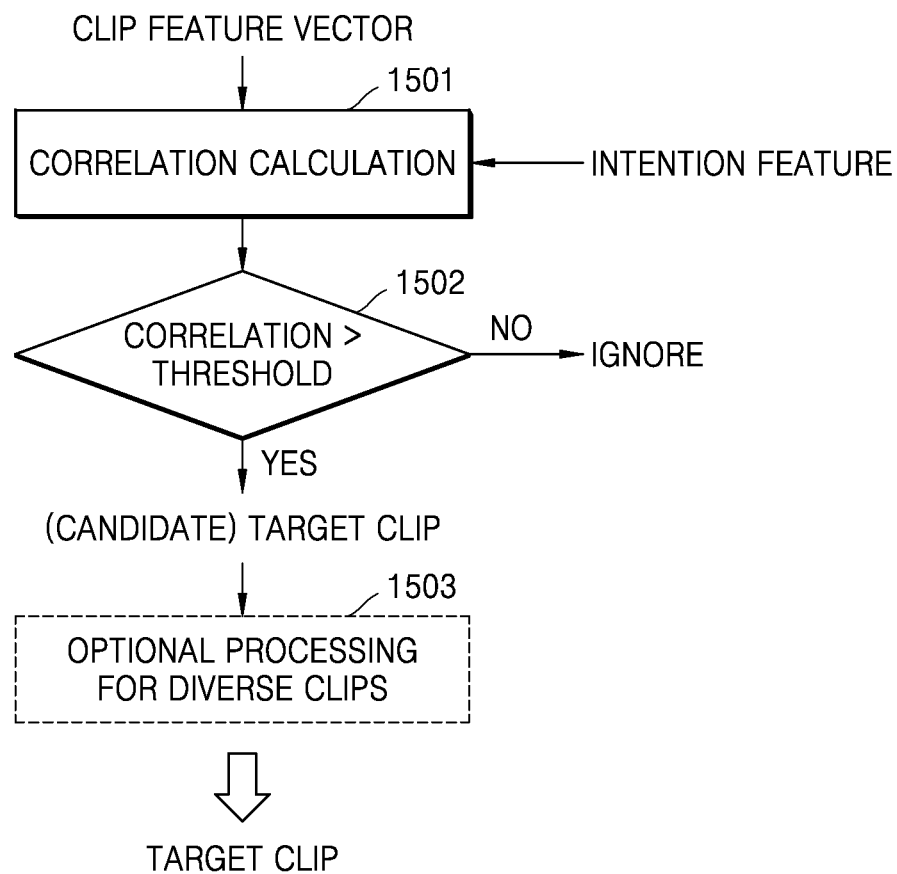
FIG. 15 is a flowchart of a process of selecting a target clip from among action clips, based on correlation.

FIG. 15 is a schematic flowchart of a method of filtering clips, based on a correlation.

As shown in FIG. 15, for example, the preset threshold is 1. For each action clip, in 1501, the correlation is calculated based on the clip feature vector and the intention feature vector. In 1502, an action clip of which a correlation is greater than the preset threshold may be selected as the target clip. When the correlation is not greater than the preset threshold, the action clip is filtered out.

The preset threshold may be determined empirically and/or experimentally. For example, the preset threshold may be set as an average correlation of training data, that is, as an average of correlations between respective clip features of video clips within the training data and user intention features in the training data.

It needs to be noted that, when a calculation result of the correlation is a numerical value, the preset threshold may also be a numerical value, and when the calculation result of the correlation is a column vector, the preset threshold may also be a column vector of the same dimension. In other words, similarity between the column vector corresponding to the calculation result of the correlation and the column vector corresponding to the preset threshold may be calculated to select a target clip from among the action clips. For example, when a distance between the two column vectors is less than a set distance, the corresponding candidate video clip can be determined as the target video clip.

The method of FIG. 15 may not be performed in some implementations. In this case, the action clip selected based on the correlation may be used as the target clip. Alternatively, after some of the action clips are selected based on the correlation, the target clip may be re-selected from among the some action clips according to the method of FIG. 15.

c. Optional Processing for Diverse Clips 1503

It is assumed that a user wants to watch a video about "basketball game". Most of the target clips selected based on the correlation may be "shooting"-related clips. When a target video is directly produced based on these target clips, the user may recognize that the content of the target video is very simple. Considering that the user may want to see a variety of materials about a basketball game, an embodiment of the disclosure proposes a method of securing target clip diversity. The principle of the method is to compare candidate target clips with a pre-selected target clip.

The core idea of the method is to calculate the correlation between clip pairs. The smaller the correlation value is, the greater a difference between two target clips becomes, and relevance between the two target clips deteriorates. After a target clip is first found, target clips with different contents from the found target clip may be found as many as possible.

Taking the aforementioned basketball game as an example, target clips regarding shooting, dribbling, and blocking may be selected after a target clip regarding shooting is selected.

Figure 16:
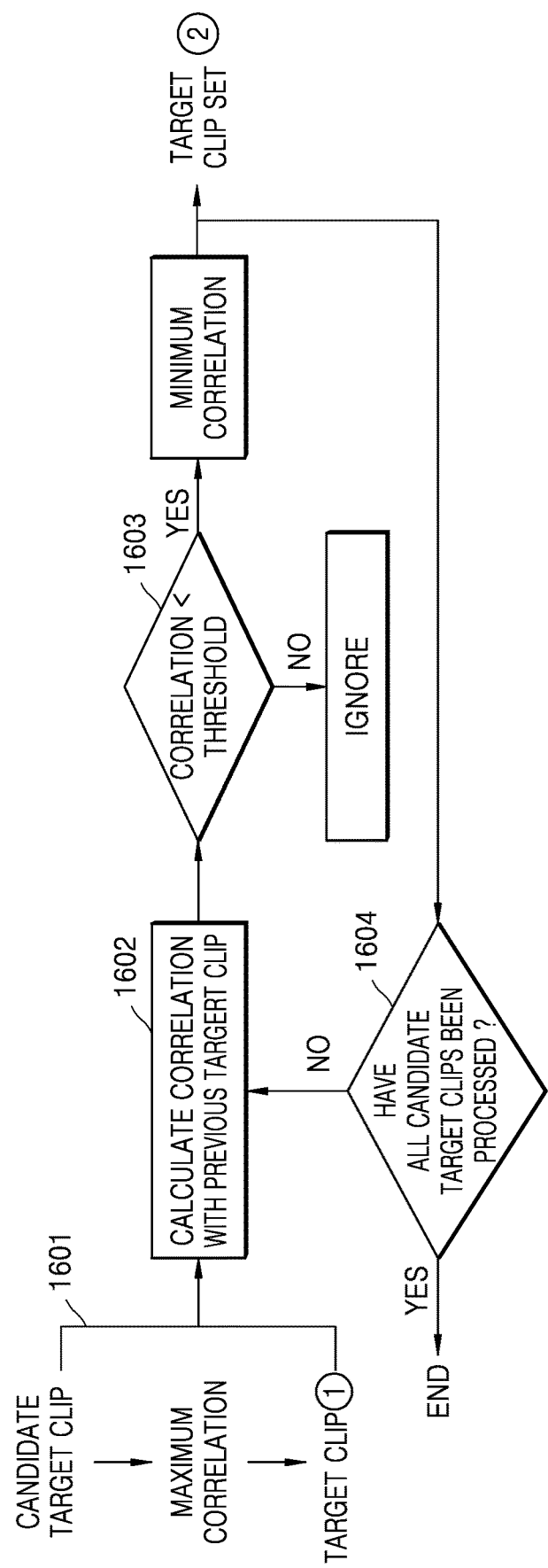
FIG. 16 is a schematic flowchart of a process of selecting a target clip in consideration of clip diversity.

FIG. 16 is a schematic flowchart of a method of selecting various target clips.

1) In 1601, a candidate target clip with a highest correlation from candidate target clips selected in the previous step b is selected as a target clip 1. The candidate target clips may be selected from action clips, based on the correlation between respective clips features of the action clips and intention features. In other words, the candidate target clips with the highest correlation between the respective clips features of the candidate video clips selected in the previous step b and the intention features are used as initially-selected target clips.

2) In 1602, correlations between the other candidate target clips and target clips are calculated. In 1603, candidate target clips with calculated correlations equal to or greater than a preset threshold are regarded as similar clips to the pre-selected target clips, and thus may be excluded. A candidate target clip with a lowest correlation from among candidate target clips with calculated correlations less than the preset threshold is added to a target clip set ②.

3) Process 2) is repeated. In other words, correlations between the candidate target clips and the pre-selected target clips (including the target clip ① and the target clips within the target clip set ② are calculated. A candidate target clip of which correlation is less than the preset threshold and is smallest is added to the target clip set ②. Process ③ may be repeated until all candidate target clips are processed according to 1604. The clips necessary for generating the target video are the target clip 1 and the target clips included in the target clip set ②.

The preset threshold may be set using the same method as the threshold setting method described with reference to operation b. In other words, the preset threshold may be set based on the training data.

Operation c is optional, and thus may not be performed in some cases. In other words, when operation c is not performed, the target clips selected in operation b may be used to generate the target video, and, when operation c is performed, the target clips selected in operation c may be used to generate the target video.

1.4 Clip Fusion

When target clips obtained for person recognition, hierarchical action recognition, and/or clip selection described above with reference to FIG. 3 includes a person clip and an action clip, pieces of information about the person clip and the action clip are combined with each other, and thus action information of a person, that is, information indicating that someone performs a certain action, may be obtained. Fusion of clips may refer to extraction of overlapping common clips from the person clip and the action clip.

Figure 17:
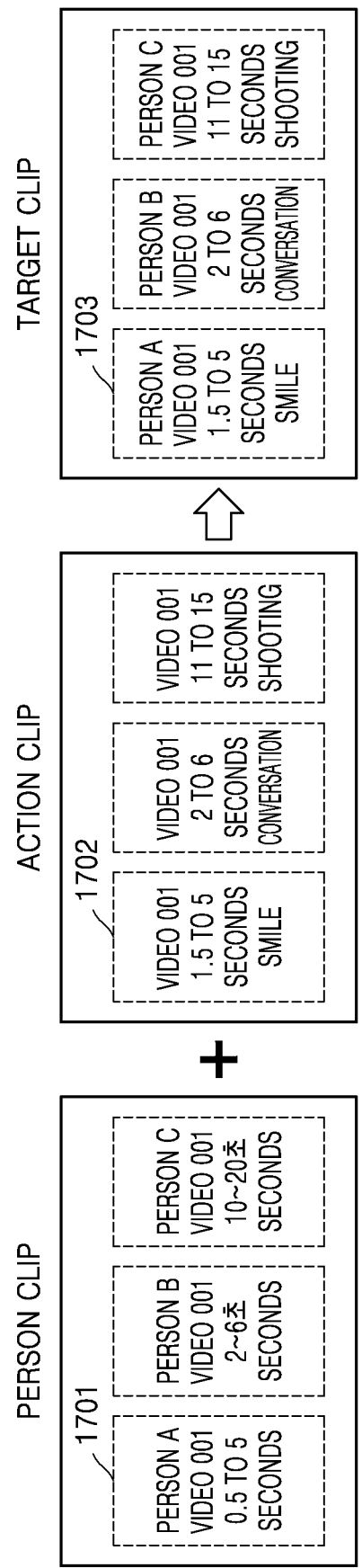
FIG. 17 is a schematic flowchart of a process of fusing a person clip with an action clip.

According to an embodiment, when the person clip and the action clip belong to the same source video, the fusion, namely, extraction of common clips, may be performed based on information of a common period of both the person video clip and the action video clip. For example, person A in a person clip 1701 shown in FIG. 17 appears from 0.5 to 5 seconds in source video 001, and an action "smile" in an action clip 1702 appears from 1.5 to 5 seconds in source video 001. Information of an optimal target clip 1703 may be obtained by fusing these two clips, such as Person A—Source video 001—1.5 to 5 seconds—Smile (that is, Person A is smiling in the clip from 1.5 to 5 seconds of the source video 001). In the same way, as all the person clips and all the action clips are processed, optimal target clips, namely, clips containing someone doing a certain action, may be obtained.

It may be understood that, in practical applications, a rules for clip fusion may be configured according to requirements. The aforementioned fusion method may be optional.

For example, a length threshold may be used. In other words, when a person clip a and an action clip b that belong to the same source video exist and both the person clip a and the action clip b belong to a common time interval greater than the length threshold in the source video, the action clip b may be considered as an action clip of a person appearing in the person clip a. The clips corresponding to the common time interval for the person clip a and the action clip b may be fused to obtain a clip where someone does something.

In addition, based on this method, the same action clip may correspond to one or more person clips. For example, a video of a meeting with several persons may include video clips where several persons do the same action at the same time. For example, in a certain period, when several persons are smiling at the same time, smiling action clips may correspond to multiple persons.

A video generation method based on hierarchical action recognition provided in an embodiment of the disclosure has at least the following merits.

The hierarchical action recognition may adaptively segment action clips and levels, based on a target length input by a user. When a user wants generation of a longer video, the hierarchical action recognition may quickly segment the source video into longer clips and obtain action types corresponding to the longer clips. For stricter time constraints, the hierarchical action recognition may segment the source video into finer action clips.

This adaptive segmentation method has two major advantages. In one advantage, classification of action types for only action proposals of a certain level may be quickly and accurately performed. Therefore, action clips may be quickly and accurately classified, the amount of subsequent data processing is effectively reduced, and video generation efficiency is improved. Existing action detection technology classifies the types of all segmented action proposals, and thus a calculation speed is slow. Also, a large number of proposals need to be classified, and thus classification accuracy may be seriously affected.

In the other advantage, in response to a short video generation request, segmented action type classification may be selected to make the action types delicate and diverse, and ultimately make generated video content more diversified and more attractive.

Target clip selection is used to filter video clips that are relevant to the user intention. Compared with the related art, the method provided in an embodiment of the disclosure may obtain a video clip desired by a user, which may better satisfy user requirements. The method provided in an embodiment of the disclosure may provide a great practical value and may greatly improve user experience.

In addition, an embodiment of the disclosure also considers the diversity of video content. In a video clip collection process, crucial semantic information about people and actions in a video may be obtained. In other words, clips where someone does something may be segmented, which is the core of video understanding. Accordingly, a target video that better satisfies user requirements may be generated.

Based on the video clip collection and video generation methods provided in an embodiment of the disclosure, at least the following technical effects may be obtained.

Segmented clips where someone does something may be obtained.

Video clips required by users may be obtained.

Segmented clips may have a variety of content. For example, when a user wants to watch a "basketball game" video, segmented video clips may include not only a video clip about "shooting" but also various fine actions of a basketball game, such as "blocking" and "dribbling".

It needs to be noted that the hierarchical recognition, clip selection, and person recognition mentioned in an embodiment of the disclosure may be used independently or in combination. The aforementioned video generation method provided in an embodiment of the disclosure is applicable to scenarios such as video editing, video story generation, and video retrieval. The aforementioned video generation method provided in an embodiment of the disclosure may be used in hardware products with a video playing function, such as smartphones, tablets, and computers, and also in background servers. In detail, a server may generate a content-rich target video according to user requirements.

Based on the method provided in an embodiment of the disclosure, user experience may be greatly improved. For example, based on the methods provided in embodiments of the disclosure, the user intention may be quickly and accurately understood, and the video desired by the user may be found or generated based on the user intention, and accurate retrieval of the video may be achieved. Moreover, related videos may be split and synthesized into video clips, and thus fast video editing may be achieved. In addition, special video effects may be added intelligently according to the content of the target video, like adding special effects to the generated target video or replacing certain content in the target video. For example, when the target video includes content where a designated person rides a bicycle by the sea, users may make more intelligent creation, such as editing the content into content of cycling in rural areas.

Based on the method provided in an embodiment of the disclosure, users may obtain rich and various videos according to their respective requirements, and thus the clips within a generated video are interesting and memorable, and may provide valuable memories to the users.

Application of the clip collection method provided in an embodiment of the disclosure will be described as follows in combination with specific scenarios.

a. Scenario 1—Video Hierarchical Action Search in Smartphone

It is supposed that a user wants to search for a video about a basketball game in the photo album of a smartphone. Based on the video generation method provided in an embodiment of the disclosure, the user may obtain the following experience.

Figure 18:
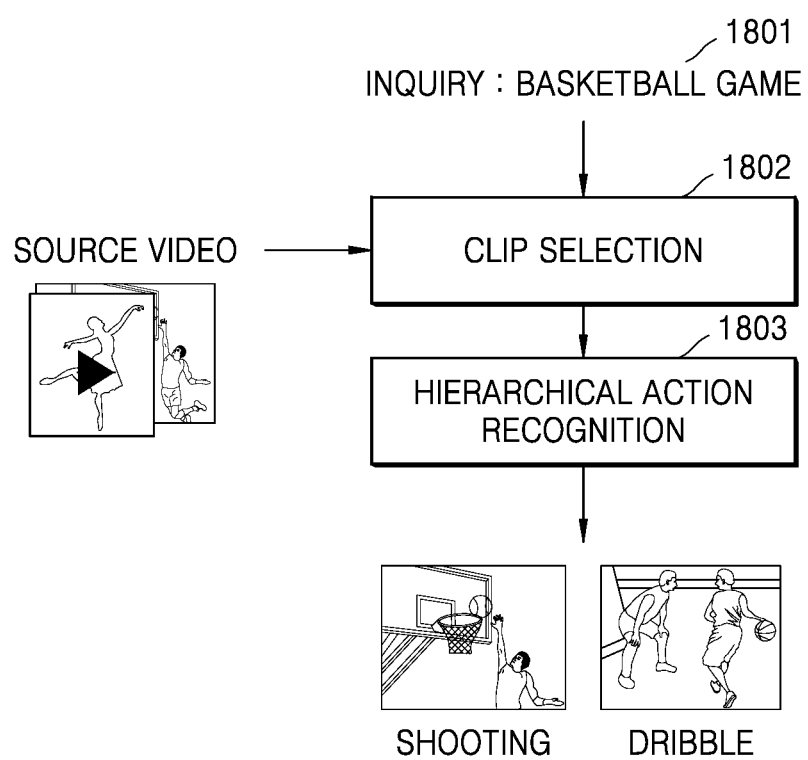
FIG. 18 is a schematic flowchart of an application scenario based on hierarchical action recognition according to an embodiment.

The user inputs the content to be searched in the form of a voice or text. A query 1801 shown in FIG. 18 is a "basketball game".

A program installed on the smartphone calculates correlation between the video clips of the source videos stored in the photo album and searches for necessary video clips. In other words, in 1802, the program installed on the smartphone filters the video clips of the source videos in the smartphone according to user requirements in order to obtain target clips, and, in 1803, applies hierarchical action recognition with respect to these video clips, as in the schematic flowchart of FIG. 18. 11 shooting-related clips, 16 dribble-related clips, and 3 blocking-related clips, for example, may be obtained from a result of the hierarchical action recognition. In other words, 30 clips related to a basketball game in the album may be obtained.

This scenario is very convenient and practical for users who love basketball. A user may quickly watch videos taken before, select his or her favorite moments, and then share them with friends. The user may also review the scene at that time or analyze sports outcome at that time.

b. Scenario 2—People Video Search in Smartphone

When a user wants to search for his or her child's video in the photo album of a phone, the user may obtain the following experience.

The user inputs information 1901 of a person (e.g., a person picture) to be searched.

Figure 19:
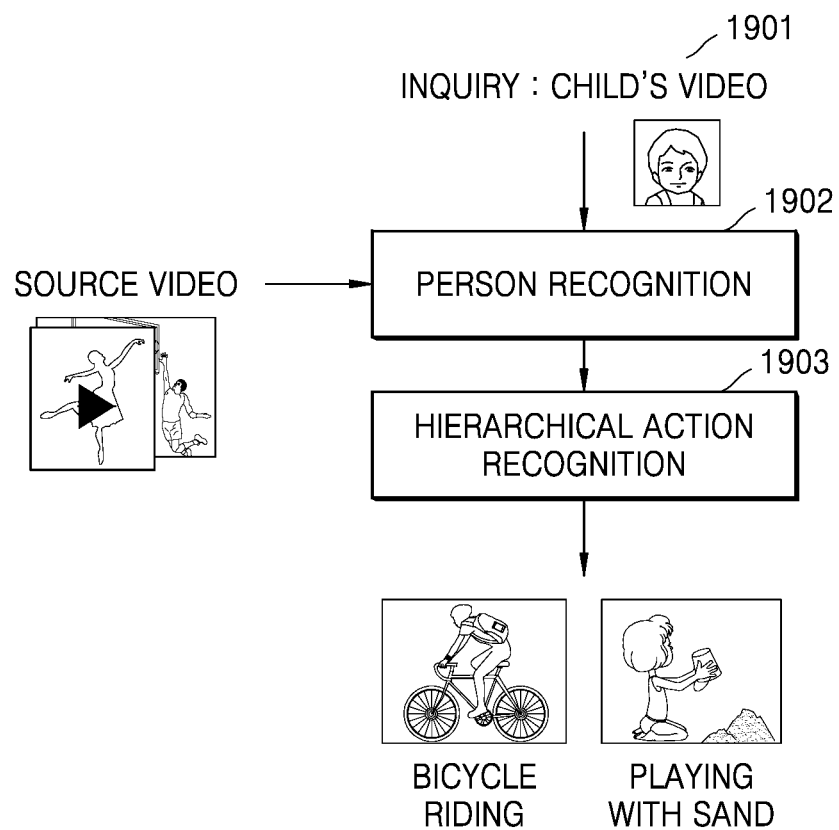
FIG. 19 is a schematic flowchart of an application scenario based on hierarchical action recognition according to an embodiment.

A program installed on the phone performs person recognition 1902 on the videos in the album, searches for person clips, and then applies hierarchical action recognition 1903 with respect to these person clips. As shown in FIG. 19, a clip where a user's child rides a bicycle and a clip where a user's child plays with sand, for example, may be obtained according to person recognition and hierarchical action recognition.

This scenario is very convenient and practical for the user, and the user may search for a person of interest, check out related moments, and then share the related moments with friends and family or bring sweet memories. In particular, this scenario is suitable for watching video clips of couples and family from a large number of cluttered videos.

The video clip collector 130 provided in an embodiment of the disclosure may be implemented in a mobile device (e.g., a smartphone). After the video clip collector 130 is implemented in the mobile device, the mobile device may receive a video generation request from a user, and may perform person recognition and hierarchical action recognition with respect to the user's multiple videos stored in the mobile device. Various video clips obtained as a result may be displayed on the mobile device.

For example, each video clip may show a scene where someone is doing something. For example, person information (such as, a person portrait) appearing in a user's source video may be displayed on the screen of the mobile device, and the user may click on a person portrait to enter a personal page corresponding to the person portrait. Alternatively, related videos clips about the person may be displayed as the user clicks on a person portrait, and various video clips may be classified according to action categories, and video clips of different types may be displayed on the screen of the mobile device.

Based on the method provided in an embodiment of the disclosure, persons and clips appearing in the video of the album of a terminal device may be displayed, and the action classification labels of the clips may be displayed. A wonderful video of a length given by a user may be automatically generated and shared.

The method provided in an embodiment of the disclosure needs to be used in an application with a video generation function, and a user interface of the application may be used to display information about various video clips used to generate the target video, for example, a person appearing in the video clips, video clips of the person, and all action video clips of a particular person.

The attention-based video generation method provided in an embodiment of the disclosure will now be described in detail in combination.

As can be seen from the foregoing description, an existing video generation method generally generates a video by relying on only simple rules without considering semantic information and video content of a video.

There are two main problems when using the existing video generation method. Firstly, in order to deal with different scenarios, different rules need to be summarized. For some special or complex scenarios, it may be difficult and complicated to extract and summarize a video generation rule. Secondly, user videos, namely, source videos, are often rich in themes and content, and may cover travel, family gatherings, daily life, etc. Existing video generation methods need to allocate one rule for each video theme, which causes a huge workload, and clip extraction rules take up a lot of storage space of a device. Therefore, in the existing video generation methods, it is difficult to generate a video including a large number of content, and the generated video does not satisfy user requirements.

In order to solve these problems, an embodiment of the disclosure proposes a video generation method based on an attention mechanism capable of automatically editing a video clip based on video content, user intentions, and the spatio-temporal property of the video clip. Accordingly, a target video that the user wants the user may be generated.

Figure 20:
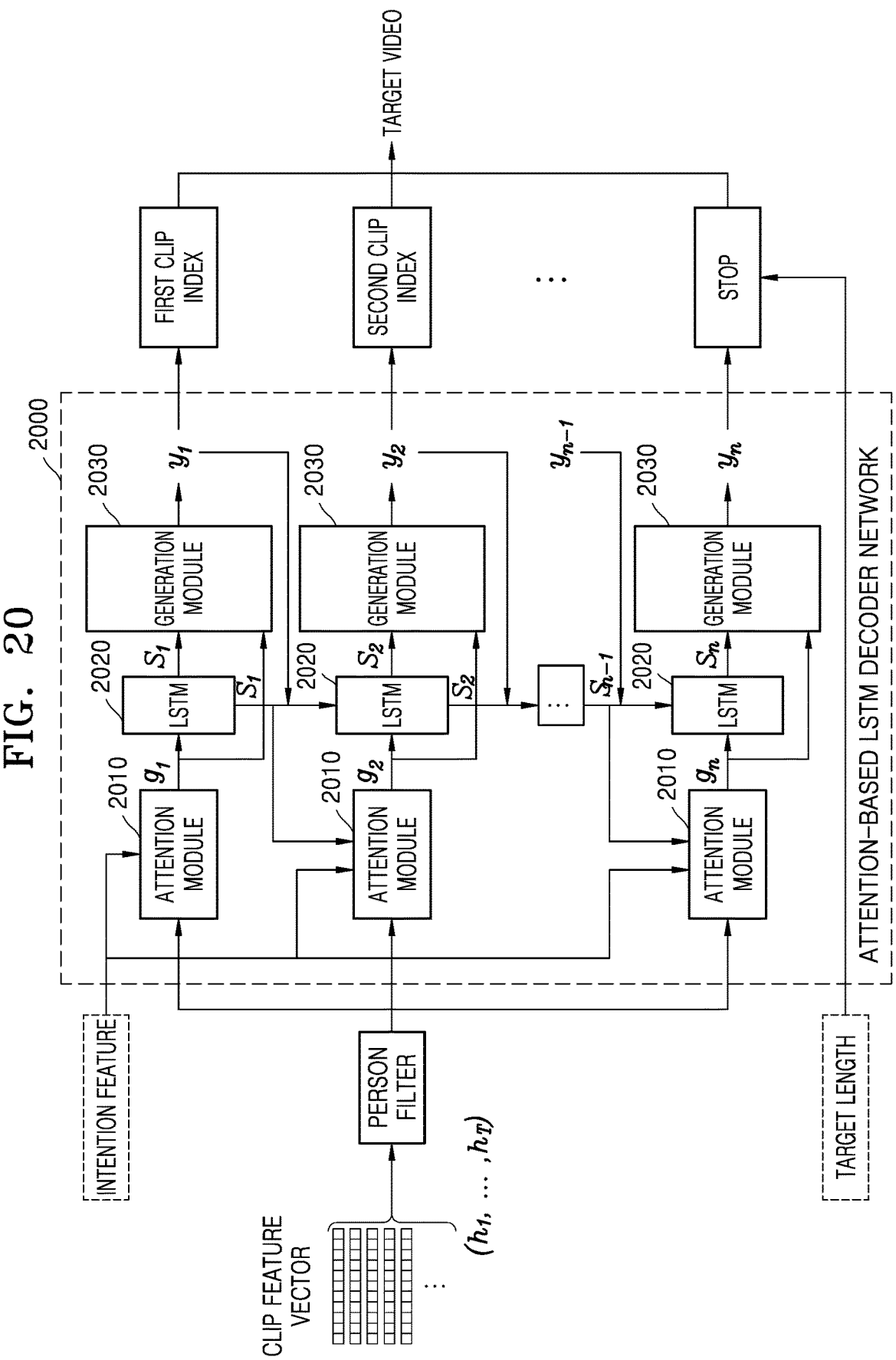
FIG. 20 is a schematic flowchart of a video generation process based on an attention mechanism, according to an embodiment.

FIG. 20 is a schematic flowchart of a method of generating a target video, based on an attention mechanism, according to an embodiment.

The method may be implemented by using a video generation network 2000 with an attention mechanism (attention module 2010 shown in FIG. 20). As shown in FIG. 20, the video generation network 2000 (attention-based long short-term memory (LSTM) decoder network shown in FIG. 20) includes attention modules 2010, LSTM networks 2020, and generation modules 2030.

An input of the video generation network may include clip features of target clips, user intention features, and a length of a target video that a user wants to generate (that is, a target length). An output of the video generation network is a target video that is a video that the user wants.

The attention modules may combine intention features with the clip features of target clips (also referred to as clip feature vectors), and the LSTM networks and the generation modules may consider an internal relationship between the target clips and search for a best clip sequence.

The clip features of the target clips may be obtained by the video clip collector 130. It is assumed that the number of target clips is T, their clip features are $\{h_1 \text{ to } h_T\}$ (where $h_j$ represents the clip feature of a j-th ($1 \le j \le T$) target clip), the intention feature of the user is $f_{intention}$, and the target length is L. Details of the method are as follows.

a. Each target clip is filtered through a person-based filter (person filter). This operation is optional. For example, when a user wants to generate a video including a certain person (for example, the user provides images of a person included in a target video), it is necessary to filter each target clip by using the person-based filter. When not specified, the person-based filter may not be used.

b. A desired target video is generated through the attention-based LSTM decoder network. The attention modules may use the following formula to calculate the attention weights of the target clips.

$$e_{t,j} = v^T \tanh(Ws_{t-1} + Vh_j + Kf_{intention} + b) \quad \text{[Equation 2]}$$

In Equation 2, $e_{t,j}$ represents the attention weight of a j-th target clip of an attention module at a t-th time point, and $s_{t-1}$ represents hidden state variables of the LSTM network at a (t−1)th time point (also may be referred to as the hidden state feature, hidden state feature vector, hidden vector, hidden representation, hidden state variable, etc.). As shown in FIG. 20, $s_1$, $s_2$, and $s_{n-1}$ respectively represent hidden state variables at an initial time point, a second time point, and an (n−1)th time point, W, V, and K respectively represent projection parameter matrices of $s_{t-1}$, $h_j$, and $f_{intention}$, b is the bias of the attention module, and Tanh is an activation function which is used for normalization of the feature vector, for example, normalization of the feature vector to (−1,1). $v^T$ is the weight matrix of the attention module, and is used to convert the dimension of a normalized feature vector to a designated dimension. Each of W, V, K, and $v^T$ is a network parameter of the attention module, and may be obtained through training.

In a description related to the video generation network, a time point or time (such as, a time point t, a time t, or the like) is a relative time concept, which refers to the time stamp of each of operations performed according to a sequence. For example, $s_{t-1}$ may be understood as a (t−1)th operation, and $e_{t,j}$ may be understood as an attention weight for a j-th target clip in a t-th operation.

Figure 21:
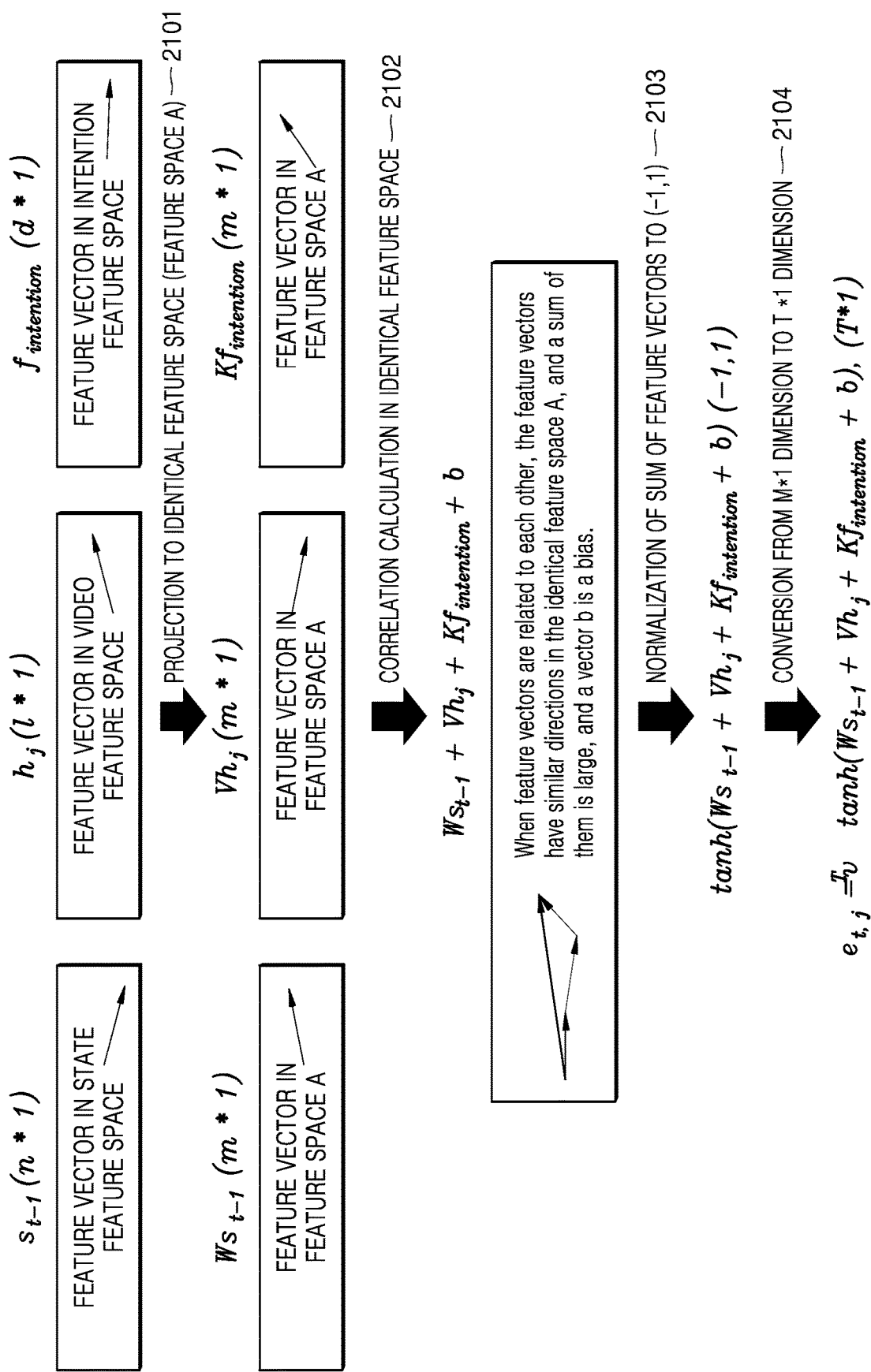
FIG. 21 is a schematic flowchart of a method of determining an attention weight.

FIG. 21 is a schematic flowchart of a method of calculating an attention weight.

As shown in FIG. 21, the method may mainly include the following contents.

First, in order to calculate the attention weight, the features of different feature spaces need to be projected into the same feature space to calculate a correlation between the features of the different feature spaces and perform normalization. The feature vectors are converted to T* 1 to obtain the attention weight of an input target clip.

In detail, as shown in FIG. 21, when taking the j-th target clip as an example, the feature vector of the clip features of a target clip is a 1*1-dimension feature vector, and corresponds to $h_j(l*1)$ shown in FIG. 21. The feature vector of the intention features is a d*1-dimension feature vector in a user intention feature space, that is, a d-dimension column vector, and corresponds to $f_{intention}(d*1)$ shown in FIG. 21, and $s_{t-1}$ is a n*1-dimension feature vector. In 2101, for respective feature vectors, $s_{t-1}$, $h_j$, and $f_{intention}$ may be projected into the same feature space (feature space A shown in FIG. 21) through projection parameter matrices W, V, and K, respectively, and the dimensions of projected feature vectors, namely, $Ws_{t-1}(m*1)$, $Vh_j(m*1)$, and $Kf_{intention}(m*1)$ shown in FIG. 21, are m*1. The arrows in FIG. 21 respectively indicate the direction vectors of feature vectors.

After the feature vectors are projected into the same feature space, in 2102, the correlation between the feature vectors may be calculated through $Ws_{t-1} + Vh_j + Kf_{intention} + b$. According to the previous description of the correlation between features, when a correlation between a plurality of feature vectors is high, the feature vectors need to have relatively similar directions in the same feature space, and a sum of the feature vectors needs to be relatively large. Therefore, the correlation between the three feature vectors may be calculated by $Ws_{t-1} + Vh_j + Kf_{intention} + b$. A bias vector (feature vector b shown in FIG. 21) is an offset, and makes Equation 2 more robust under an extreme condition such as, $Ws_{t-1} + Vh_j + Kf_{intention} = 0$.

Due to a large variation range of a sum of the feature vectors, it is difficult for the attention module to learn network parameters during training. Accordingly, in 2103, the sum of calculated feature vectors may be normalized to (−1,1) by the activation function tanh. In other words, a feature vector with the value range of (−1,1) and the dimension of m*1 may be calculated by Equation tanh $(Ws_{t-1} + Vh_j + Kf_{intention})$. Thereafter, in 2104, the dimension of a feature vector corresponding to the correlation may be projected from m*1 to T*1 by the feature dimension projection matrix $v^T$.

After the attention weight of each target clip at a current time point t is determined, the attention weight may be normalized to [0,1]. Equation 3 for normalization is as follows.

$$a_{t,j} = \frac{\exp(e_{t,j})}{\sum_{j=1}^{T} \exp(e_{t,j})} \quad \text{[Equation 3]}$$

In this case, a feature vector input to the LSTM network, that is, a feature vector output by the attention module, is a weighted summed feature vector. The weighted summed feature input to the LSTM network at a time point t is as Equation 4 below.

$$g_t = \sum_{j=1}^{T} a_{t,j} h_j \quad \text{[Equation 4]}$$

As shown in the example of FIG. 20, $g_1$, $g_2$, and $g_n$ represent weighted summed clip features of the initial time point, the second time point, and the n-th time point, respectively. In other words, $g_1$, $g_2$, and $g_n$ represent weighted summed clip features corresponding to the first operation, the second operation, and the n-th operation, respectively.

The index of the target clip selected at the time point t may be obtained through the LSTM network and the generation module. The calculation process is as Equations 5 and 6 below.

$$s_t = \text{LSTM}(y_{t-1}, g_t, s_{t-1}) \quad \text{[Equation 5]}$$

$$y_t = \text{Generate}(s_t, g_t) \quad \text{[Equation 6]}$$

At the time point t, input information of the LSTM network includes $y_{t-1}$, $s_{t-1}$, and $g_t$, and output information thereof is $s_t$, which is a hidden state feature at the time point t, and indicates information recorded by LSTM network. Here, $y_{t-1}$ represents the index (that is, the identifier) of the target clip output by the generation module at a last time point, i.e., at a time point t−1. In other words, $y_{t-1}$ is the index of the target clip determined in the previous operation. Input information of the generation module includes $s_t$ and $g_t$, and output information thereof is the index of the target clip selected by the generation module at this time point, i.e., $y_t$. For example, when a third target clip from among the target clips is selected at the time point t, $y_t$ is 3. In the example shown of FIG. 20, $y_1$, $y_2$, and $y_n$ respectively represent the indexes of the target clips selected at the initial time point, the second time point, and the n-th time point.

c. At the time point t, when the length of a generated video is greater than or equal to a target length L, the video generation network stops. At this time, a target video composed of target clips selected according to a time sequence is generated.

In the video generation method provided in an embodiment of the disclosure, a main input of the LSTM decoder network based on the attention mechanism is a segmented video clips, and an output thereof is a target video composed of the selected video clips.

It is assumed that there are 10 target clips related to a "basketball game", where a first target clip is a "shooting" clip, a third target clip is a "dribble" clip, and a fifth target clip is a "blocking" clip. It is assumed that the goal of the LSTM decoder network is to generate a target video including content of "dribble" (t−2)→"shooting" (t−1)→"blocking" (t), that is, the target video includes three target clips that are the "dribble" clip, the "shooting" clip, and the "blocking" clip are generated in chronological order. Then, the output of the LSTM decoder network needs to be 3(t−2)→1(t−1)→5(t). In other words, an output of the LSTM decoder network at the time point t−2 is an index 3 of the "dribble" clip, an output at the time point t−1 is an index 1 of the "shooting" clip, and an output at the time point t is an index 5 of the "blocking" clip. In detail, when taking the time point t as an example, the input $g_t$ of the LSTM decoder network is a weighted summed feature of the 10 target clips, and the weight is calculated based on the clip features of the target clips, the user intention features, and the hidden state variables of the LSTM decoder network at the time point t−1. At this time, $y_{t-1}$ is the index 1 of the "shooting" clip selected at a previous time point, and $s_{t-1}$ is information recorded by the LSTM decoder network from the first time point to the time point t−1, and may be understood as a state "shooting" of the previous time point. At the time point t, the output of the LSTM decoder network is the index 5 of the "blocking" clip.

It may be known from the foregoing description that the attention-based video generation method proposed in an embodiment of the disclosure mainly includes two parts, namely, the attention mechanism and the LSTM decoder network. In this method, a user intention is added to calculation of an attention weight. In existing video generation methods, the user intention is not added to the calculation of the attention weight. In addition, a better video generation effect may be obtained than the rule-based method, by using the LSTM decoder network based on the attention mechanism to generate the video desired by the user.

For example, it is assumed that four videos were shot at the same place at different times (spring in 2016, autumn in 2017, winter in 2018, and summer in 2019). When videos are ordered by time line, generally only an order of "2016-2017-2018-2019" may be obtained. However, when the LSTM decoder network provided in an embodiment of the disclosure is used, videos arranged in four seasons "Spring-Summer-Autumn-Winter" may be generated, and thus user requirements and user perception may be more satisfied.

In addition, the LSTM decoder network can learn many movie-level cut-and-splice techniques, such as switching between near and far perspectives, complicated montage techniques, or insertion of another clip representing a mood scene in a video. Therefore, according to the video generation method based on the attention mechanism provided in an embodiment of the disclosure, a video providing a better effect and more satisfying user expectations may be obtained.

Figure 22:
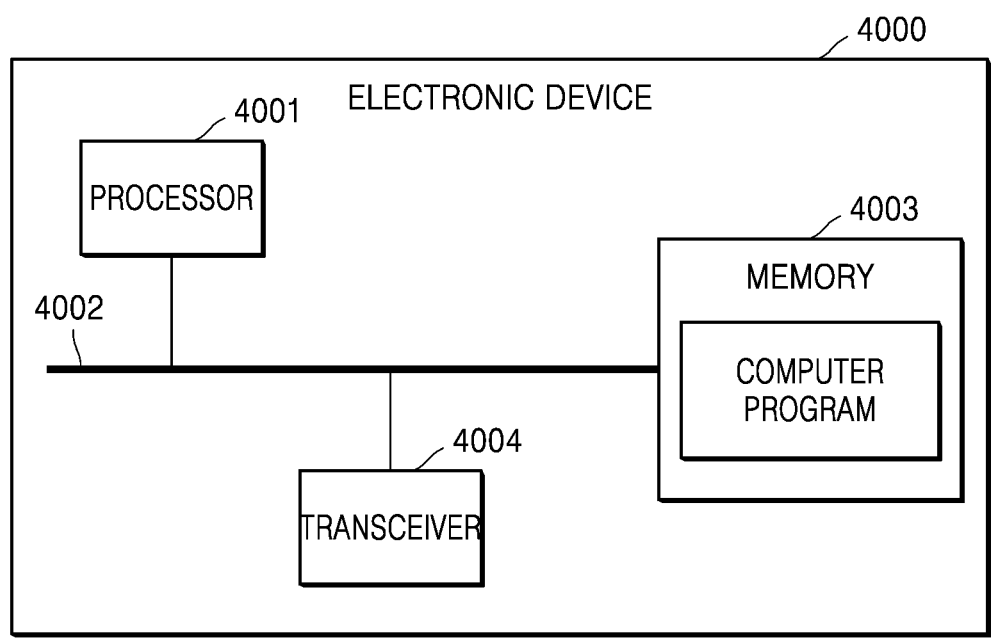
FIG. 22 is a block diagram of an electronic device according to an embodiment.

FIG. 22 is a block diagram of an electronic device 4000 according to an embodiment.

The electronic device 4000 may include in the above-described video generation apparatus 100.

Referring to FIG. 22, the electronic device 4000 includes a processor 4001 and a memory 4003. The video feature extractor 110, the intention feature extractor 120, the video clip collector 130, and the video generator 140 may be implemented as the processor 4001.

The processor 4001 and the memory 4003 are connected to each other via, for example, a bus 4002. Optionally, the electronic device 4000 may further include a transceiver 4004. In actual applications, the transceiver 4004 is not limited to one, and the structure of the electronic device 4000 is not limited to an embodiment of FIG. 22.

The processor 4001 may be a central processing unit (CPU), a general-purpose processor, a digital signal processor (DSP), an application specific integrated circuit (ASIC), or a field programmable gate array (FPGA), a programmable logic device, a transistor logic device, a hardware component, or any combination thereof. The processor 4001 may implement or execute various exemplary logical blocks, modules, and circuits described in connection with the disclosure.

The processor 4001 may also be a combination that realizes a computing function, for example, a combination including one or more microprocessors, a combination of a DSP and a microprocessor, or the like.

The bus 4002 may include a path for transmitting information between the aforementioned components. The bus 4002 may be a peripheral component interconnect (PCI) bus or an extended industry standard architecture (EISA) bus, or the like. The bus 4002 may be divided into an address bus, a data bus, a control bus, and the like.

The memory 4003 may be a read only memory (ROM), a random access memory (RAM), another type of static storage device, or another type of dynamic storage device. Alternatively, the memory 4003 may be Electrically Erasable Programmable Read Only Memory (EEPROM), Compact Disc Read Only Memory (CD-ROM), an optical disk storage (e.g., a compact disc, a laser disc, an optical disc, a digital versatile disc, and a Blu-ray disc), a disk storage medium, a magnetic storage device, or any other medium that may carry or store a program code and may be accessed by a computer, but embodiments are not limited thereto.

The memory 4003 is configured to store a program code for executing the method of the disclosure, and execution of the program code is controlled by the processor 4001. The processor 4001 is configured to execute the program code stored in the memory 4003 to implement at least one of the foregoing embodiments.

Figure 23:
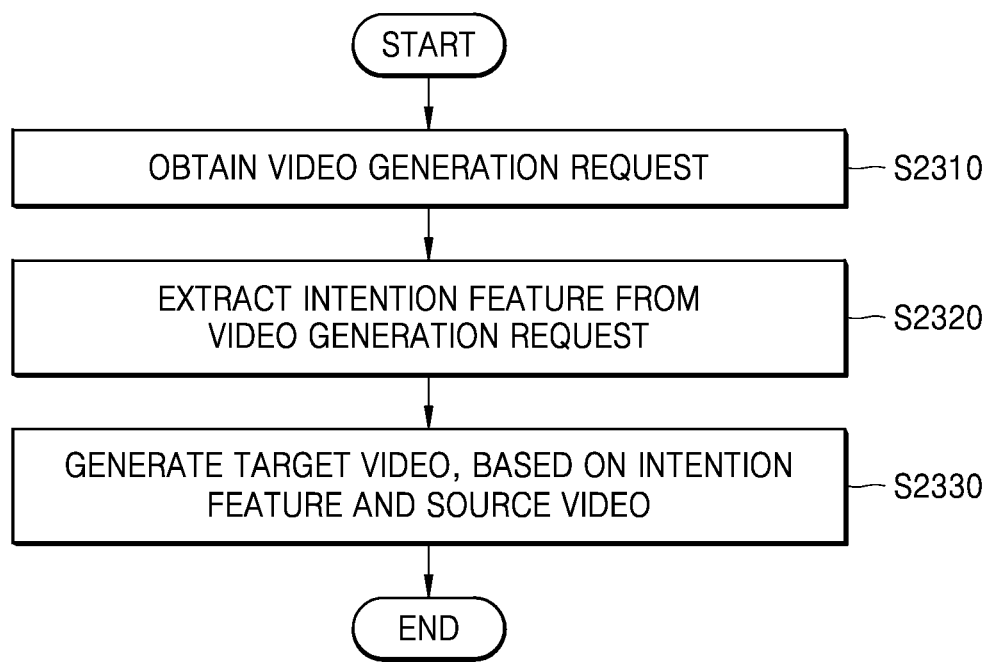
FIG. 23 is a flowchart of a video generation method according to an embodiment.

FIG. 23 is a flowchart of a video generation method according to an embodiment.

The video generation method according to an embodiment may be performed by the above-described video generation apparatus 100.

Referring to FIG. 23, in operation S2310, the video generation apparatus 100 obtains a video generation request.

The video generation request may include a request for what video the user wants to generate, that is, a user's intention. For example, the video generation request may include a type of the video that the user wants to generate, and a subject or object of the video that the user wants to generate. The video generation request may also include the length (i.e., a target length) of the video that the user wants to generate.

For example, the video generation request may be "I want to generate a 5-minute video of a basketball game" or "Please help me to generate a 5-minute video of a basketball game". The video generation request includes the theme of the video that the user wants to generate, which is "basketball game", and the length of the video, which is 5 minutes. For another example, a video generation request is "I want to generate a video where a child is riding a bicycle", and the video generation request includes an object of the video, which is a "child", and a theme of the video, which is "riding a bicycle".

In operation S2320, the video generation apparatus 100 extracts intention features from the video generation request. The intention features may be extracted through a neural network. For example, the intention feature may be extracted through an RNN.

In operation S2330, the video generation apparatus 100 generates a target video, based on the intention features and source videos.

According to an embodiment, the source videos may be videos specified by the user, and also may be videos that the video generation apparatus 100 is authorized to obtain.

The user may specify the source videos in any of various manners. For example, the user may designate the videos obtained during a certain time period (can be taken by the user or obtained from other devices) as the source videos.

An optional manner, the video generation request of the user may include indication information of source videos, such as time periods during which the source videos were obtained). In this case, when the video generation request of the user is obtained, the videos acquired during the corresponding time periods may be used as the source videos. Alternatively, after obtaining the video generation request of the user, the video generation apparatus 100 may display all obtainable videos and may use, as the source videos, videos selected by the user from among the displayed videos.

In actual applications, the videos obtainable by the video generation apparatus 100 may be all of the videos stored in the terminal device of the user or a cloud storage space. A considerable part of these videos may be irrelevant to the video that the user wants to generate. Therefore, in order to reduce the number of source videos and reduce the amount of subsequent data processing, the obtainable videos may be filtered first, and the filtered videos may be used as the source videos.

According to an embodiment, the obtainable videos may be filtered based on the intent features of the video generation request. For example, the video features of the obtainable videos may be extracted, and some irrelevant videos, for example, videos whose correlation between the intention features and video features are less than a set value, may be filtered out. The set value may be configured variously according to requirements. The larger the set value is, the more videos are filtered out, fewer source videos are obtained, and the amount of data to be processed subsequently is reduced. Similarly, the smaller the set value is, the less videos are filtered out. However, when the set value is too large, there may be the video wanted by the user within the filtered videos, and thus, as an optional method, the set value may be relatively small.

According to an embodiment, the obtainable videos may be filtered based on a keyword within the video generation request. For example, videos may be filtered according to a keyword extracted from the video generation request, and the source videos may be selected.

Other video filtering methods may also be used to filter the source videos, and different filtering methods may be used individually or in combination with each other.

In the video generation method according to an embodiment, by taking the user's intention into consideration when generating a target video, the generated target video may better reflect the user's actual intention and the user's actual requirements, and thus user perception may be improved.

The video generation method according to an embodiment may be executed by an electronic device, for example, the terminal device of the user. Alternatively, the video generation method according to an embodiment may be executed by a server. For example, the user may initiate the video generation request through a user interface of an application program installed on his or her terminal device. The terminal device may transmit the video generation request to a server, and the server may generate a target video by using videos stored in the server or obtained from other storage spaces (e.g., an external storage device, a cloud storage space, a user terminal device, etc.) and the video generation method provided in an embodiment of the disclosure. When the generation of the target video is completed, the server may transmit the target video to the terminal device, and the terminal device may play and/or store the target video.

When the video generation method according to an embodiment is executed by the terminal device of the user, the terminal device may extract intention features, based on the video generation request of the user, and may generate a target video corresponding to the user's actual intentions, based on the extracted intention features and videos (e.g., videos stored in the terminal device and/or videos obtained from other storage spaces).

The video generation apparatus 100 will now be described as a subject that executes the video generation method, and videos stored in the video generation apparatus 100 will now be used as an example for explaining the video generation method. However, from the foregoing description, the videos used to generate a target video may be videos stored in the terminal device of the user, the external storage device, or the like.

The intention features extracted from the video generation request may include action intention features. In order to generate a target video that better satisfies the user's intention, deep feature extraction may be executed on the user's video generation request. According to what actions need to be included in a video that the user wants to generate, a target video that better satisfies the requirements of the user may be generated based on the action intention features and the source videos.

According to an embodiment, the video generation apparatus 100 may extract video features of the source videos, determine video clips in each of the source videos, based on the video features of the source videos, obtain target clips by filtering the video clips based on intention features, and generate a target video based on the target clips.

In detail, when the target video is generated based on the intention features and the source videos, some video clips may be selected based on the respective video features of the candidate videos, and then the target clips may be selected from the video clips, based on the intention features. Instead of directly using one or some videos as the target videos, the video clips selected based on the video features are used to generate the target videos, and thus the target videos may be more interesting and attractive.

The method of determining video clips from the source videos, based on the video features of the source videos, may be configured as needed. For example, some clips having similar content in the source videos may be filtered according to similarity between the clips. Deduplication between similar video clips may be performed by recognizing an object (such as, people) in the source videos and filtering video clips including the recognized object, and the like.

According to an embodiment, the video features may include visual features and/or optical flow features of the source videos.

The visual features of the source videos may include the features extracted from visual content of the source videos. The visual content may include, but is not limited to, pixel values, color information, objects, or the like within the frames of the source videos.

An optical flow is caused by the movement of a foreground target in a scene and/or the movement of a photographing device. When human eyes observe a moving object, the scene of the object forms a series of continuously changing images on the retina of the human eye. Because a series of changing information continuously flows through the retina (i.e., an image plane), like a "flow" of light, the series of changing information may be referred to as an optical flow. In other words, optical flow features may reflect the changing information of the objects.

The visual features and the optical flow features may be extracted through a neural network. For example, the visual features may be extracted through a convolutional neural network, and the optical flow features may be extracted through Flownet. Optionally, when the visual features are extracted through a neural network, a three-dimensional convolutional neural network (3D-CNN) may be used. The visual features extracted through the 3D-CNN may reflect a temporal relationship between the frames of a video in addition to the content of the video.

As an optional manner, the video generation apparatus 100 may use both the visual features and the optical flow features in order to better ascertain the content in the source video and changing information of the content through different types of features. Thus, video clips that more satisfy the user intention and is rich with content may be selected, and a better target video may be generated.

According to an embodiment, object clips including objects may be obtained through object recognition based on the video features of the source videos. In addition, time lengths including actions may be obtained through action recognition based on the video features of the source videos, and action clips corresponding to the time lengths may be obtained.

The objects recognized through object recognition may include people such as men, women, or children. In actual applications, when the video generation request includes information of a designated object, object clips may be filtered based on the video features and object-related information included in the video generation request, and thus object clips containing the designated object may be selected. When the video generation request does not include information of the designated object, for example, when the video generation request is "Please help me to generate a video of a basketball game", object clips containing an object such as people may be obtained through object recognition based on the video features.

According to an embodiment, as an action is recognized based on the video features, pieces of period information of one or more video clips included in the source videos. The period information may be a duration of the action existing in a video clip. The period information may include a time length of a video clip in a source video, or may include the start and end time. Alternatively, the period information may include the start time and the time length of the video clip, or may include the end time and the time length of the video clip. For example, when a video clip is a clip from 10 seconds to 15 seconds in a source video, the period information may indicate a time length ranging from 10 to 15 seconds, or may indicate a start time of 10 seconds and an end time of 15 seconds. Alternatively, the period information may indicate a start time of 10 seconds and a time length of 5 seconds, or a time length of 5 seconds and an end time of 15 seconds. Of course, the period information may also be configured in other forms.

Because the period information reflects the time length of a video clip where an action may exist in the source videos, the period information may be referred to as an action proposal of the video clip. The action proposal may be understood as a period proposal for the video clip where the action may exist.

For a source video, after respective action proposals of the video clips in the source video, the action proposals may be filtered based on some rules. For example, the action proposals may be filtered based on the time lengths of the action proposals. In addition, filtering may be performed based on the intention features of the video generation request and clip features of video clips corresponding to the action proposals. For example, based on correlation between the clip features of the respective action clips corresponding to the action proposals and the intention features, action clips with a high correlation (for example, a correlation greater than a set value) may be selected as the target clips that are used for subsequent processing, for example, generation of a target video.

According to an embodiment, a neural network may identify an action in a source video, based on the video features of the source video, in order to obtain period information.

According to an embodiment, when an object clip and an action clip are included in the same source video, the object clip and the action clip included in the same source video may be merged with each other, and a target video may be generated based on a result of the merging.

According to the merging between the object clip and the action clip included in the same source video, a video clip about a specific object doing some action may be obtained. Of course, at least some of the video clips that have not been merged may also be used to generate the target video. In other words, when the merging operation is performed on the video clips, the merged video clips and the not-merged video clips may be both used as target clips for generating a target video.

According to an embodiment, the video generation apparatus 100 may determine the levels of action clips, based on respective time lengths of the action clips, in order to filter the action clips, and may filter the action clips according to the determined levels.

In other words, after action proposals of a source video are obtained, level allocation of the action proposals may be performed according to the time lengths of the action proposals, and filtering of the action proposals may be performed based on the levels allocated to the action proposals. The level allocation may be based on the time lengths of the action proposals.

In general, the time length of an action clip corresponding to an action proposal with a higher level is equal to or greater than the time length of an action clip corresponding to an action proposal with a lower level. For example, when level 1 is a highest level (that is, the larger a number corresponding to a level is, the lower the level is), the time length of an action clip of an action proposal belonging to level 1 is equal to or greater than the time length of an action clip of an action proposal belonging to level 2.

Optionally, level allocation of the action proposals is not performed, and all action clips corresponding to the action proposals may be used as action clips that are used for a subsequent process, for example, calculation of the correlation with the intention features, or as target clips that are used to generate a target video. The filtering of the action proposals performed based on the levels of the action proposals may reduce the amount of subsequent data processing and improve the generation efficiency of the target video.

The method of filtering the action clips, based on the respective levels of the action proposals, may be configured according to requirements. For example, the action clips corresponding to an action proposal of a certain or higher level may be selected for a subsequent process. Alternatively, a certain number of respective video clips corresponding to the levels may be selected for a subsequent process. The number of action clips corresponding to different levels may be the same or may be different. For example, three action clips in each level may be selected, and three action clips may be selected from the action clips corresponding to the levels, randomly or according to a pre-configured method (such as, a method of selecting a clip with a longer length). When the number of action clips corresponding to a certain level is less than three, for example, when there are two action clips belonging to the certain level, the two video clips may be selected for a subsequent process.

According to an embodiment, the video generation apparatus 100 may determine a target level in order to filter action proposals having assigned levels, and may select action clips corresponding to the action proposals having assigned levels as action clips for a subsequent process, for example, a process of calculating a correlation with the intention features or a process of generating a target video.

In other words, when the action clips are filtered based on the levels, the target level may be determined first, and the action clips of the action proposals belonging to the target level may be used as the action clips for a subsequent process.

The method of determining the target level may be configured variously according to requirements. For example, a certain level may be determined as the target level. Also, the levels allocated to the action proposals whose time lengths are within a certain length range may be determined as the target level.

In a selective embodiment of the disclosure, when the video generation request includes a target length of a target video, the target level may be determined according to a result of a comparison between a length threshold value corresponding to each level and the target length (or a limit length).

The target level may be determined according to the target length (or a limit length) of the target video and the length threshold value corresponding to each level so that the target video may more satisfy actual requirements. According to the length threshold value corresponding to each level and the target length (or a limit length), the method of determining the target level may be configured variously. For example, a level having a length threshold value closest to the target length (or a limit length) may be determined as the target level.

The length threshold value corresponding to each level may be determined according to empirical values and/or experimental values (such as, values obtained based on a large amount of sample data). For example, based on a large number of samples, the average value of respective time lengths of the action proposals belonging to the same level within the sample may be used as the length threshold value (in the description below, the length threshold value may be referred to as an average length). In general, a length threshold value corresponding to a higher level is greater than a length threshold value corresponding to a lower level. For example, when a length threshold corresponding to level 1 is 10 seconds, and a length threshold corresponding to level 2 may be 5 seconds.

A method of allocating a level according to the time lengths of action clips will be described.

According to an embodiment, a length region to which the time length of each action clip belongs may be determined, and a level corresponding to the determined length region may be determined as the level of each action clip.

According to an embodiment, a length threshold closest to the time length of each action clip may be determined, and a level corresponding to the determined length threshold may be determined as the level of each action clip.

Two optional solutions for allocating levels to action proposals are provided. One of the two optional solutions may be configuring a length region corresponding to each level and allocating a length region to which the time length of each action proposal belongs to the level of the action proposal. The other may be allocating a level corresponding to a length threshold closest to the time length of each action clip to the level of each action clip.

The length threshold corresponding to each level and the length region may be determined based on experimental values and/or empirical values. For example, according to a selective embodiment, an average of the time lengths (i.e., an average length) and a standard deviation of the action proposals having the same level within a large number of samples may be used to determine the length region, according to experience and statistical results.

According to an embodiment, there may be a common transition length region between two adjacent levels. When the time length of an action proposal belongs to the common transition length region, the two adjacent levels corresponding to the transition length region may be allocated as the level of the action proposal. In other words, when the time length of the action proposal belongs to the common transition length region, two levels may be allocated to the action proposal.

The setting of the common transition length region may make one action proposal have two levels. The setting of the common transition length region may include at least the following two advantages.

1) By making a difference between levels not big, action clips corresponding to the levels may be naturally transitioned, and human cognition may be more satisfied. This is because first few frames of a video clip included in a source video may be related to last few frames of a previous video clip, and the last few frames may be related to first few frames of a next video clip.

In other words, because an action clip may contain two or more potential actions, transitional frames containing different actions may exist in the action clip. Therefore, by setting the transition length region, level allocation of the action proposals corresponding to the action clips may more satisfy the actual situation.

2) Content diversity of video clips may be enhanced. As can be seen from the above description, the time length of an action proposal with an upper level is usually longer than the time length of an action proposal with a lower level. By setting the transition proposal region, the upper level may cover not only action clips having a relatively long time length and but also cover a small number of shorter action clips. Because the length of an action clip is determined by the duration of a certain action existing in a source video, an action clip having a relatively short time length includes an action with a relatively short duration. Therefore, an action clip with a relatively short time length may focus more on detailed actions than an action clip with a longer time length. Similarly, in actual applications, there may be a transition region between different video clips within the same source video, and scene switching may occur while a certain action is in progress due to a lens movement during video recording, and thus no actions may exist in subsequent images even when the above action continues. By setting the transition length region, a lower level may cover not only action clips with small time lengths but also action clips with large time lengths, and thus the action clips corresponding to action proposals of the lower level may cover actions in the transition length region or switching of frames due to the moving lens. In other words, due to the setting of the transition length region, action clips having more forms and more diverse content may be covered. Therefore, the type and content of action clips may be more abundant, and thus subsequently generated target videos may be more interesting and attractive.

According to an embodiment, the video generation apparatus 100 may determine the limit length, based on the target length, and may determine the target level according to a result of a comparison between the limit length and the length threshold corresponding to each level.

When the target length of a target video to be finally generated is included in the video generation request, the target video may include one or more target clips. Thus, the length of the target clips used to generate the target video should not be greater than the target length. In order to satisfy this principle, the limit length of a video may be determined based on the target length, and the target level may be determined based on the limit length.

As an optional solution, a length adjusting factor n may be set. When the target length of the target video is T', the limited length of the video T may be expressed as T=T'/n, where n is a positive value equal to or greater than 1. For example, the value of n may be a positive integer not less than 1, or may not be an integer.

According to an embodiment, the video generation apparatus 100 may determine the target level according to the limited length of the video and the length threshold corresponding to each level by using at least one of the following methods 1 and 2.

Method 1 is as follows.

The video generation apparatus 100 sequentially compares the limited length of the video with the length threshold corresponding to each level according to the descending order of the levels, and, when the limited length of the video is not less than the length threshold corresponding to a current level, determines the current level as the target level.

Method 2 is as follows.

The video generation apparatus 100 determines a current level as the target level, when the limited length of the video is not less than the length threshold corresponding to the current level, according to the descending order of the levels. When the limited length of the video is less than the length threshold corresponding to the current level, the video generation apparatus 100 determines the current level or a next level as the target level according to a first number of action proposals with time lengths not greater than the limited length from among action clips belonging to the current level and a second number of action with time lengths not greater than the limited length from among action clips belonging to the next level, or resumes the present process by setting the next level as a current level.

In method 2, when the first number is no less than the second number, the current level is determined as the target level, and, when the first number is less than the second number and the next level is the last level, the next level is determined as the target level. When the first number is less than the second number and the next level is not the last level, the first number is again compared with the second number by setting the next level as the current level. After the target level is determined, action clips corresponding to an action proposal having a time length less than the limited length of the video from among the action proposals belonging to the target level may be selected for a subsequent process.

The first number being greater than the second number ensures that the number of some (i.e., action clips having smaller time lengths than the limited length) of the action clips corresponding to the current level may become a sufficient number of action clips that meets length requirements. In other words, a sufficient number of action clips that meets the length requirements may be selected for a subsequent process.

In addition, according to the foregoing description, an action proposal having a time length belonging to the transition length region may have two levels. According to an embodiment, when two levels are allocated to an action proposal and any one of the two levels is determined as the target level, the action proposal may be regarded as an action proposal belonging to the target level. In other words, when an action proposal belongs to both level 1 and level 2 and level 1 or level 2 is determined as the target level, the action proposal may be regarded as an action proposal of level 1 or regarded as an action proposal of level 2, and thus may be used as an action clip for subsequent processing.

According to an embodiment, the video generation apparatus 100 may obtain clip features of action clips, determining correlations between the intention features and the clip features separately, and obtain target clips by filtering the action clips, based on the determined correlations.

To determine the target clips that are used to generate the target video, the action clips may be obtained, and then may be filtered based on the user intention. Thus, target clips that more satisfy the user intention may be selected, and the target video may be generated based on the selected target clips. According to an embodiment, the action clips may be filtered based on the correlations between the intention features and the clip features of the action clips. For example, action clips whose correlations are greater than a set threshold may be used as the target clips.

According to a selective embodiment, target clips may be selected from among the action clips, based on the correlations, and then some of the target clips may be selected again to better satisfy the user requirements.

According to an embodiment, some of the action clips may be selected as candidate target clips, based on correlations with the intention features, and target clips may selected from the candidate target clips according to correlations between the candidate target clips. To enrich the content of the target video, only some candidate target clips having lower correlations with the other candidate target clips are selected as the target clips.

According to an embodiment, the video generation apparatus 100 may determine a target clip from among the candidate target clips, determine the correlations between the target clip and the candidate target clips separately until all of the candidate target clips are processed, and determine a candidate target clip corresponding to a correlation which is smaller than a set value and is smallest as a new target clip.

In other words, when the candidate target clips are filtered, one or more candidate target clips may be selected first as a target clip. For example, a candidate target clip with a highest correlation from among the correlations between the clip features of the candidate target clips and the intention features may be first selected as a target clip. Thereafter, based on correlations between the target clip and the other candidate target clips, a candidate target clip having a correlation which is smaller than the set value and is smallest may be selected as a next target clip. The selection of a target clip is repeated until there is no more candidate target clips having the aforementioned correlation that is smaller than the set value and is smallest.

Because, based on this scheme, video clips with lower correlation may be selected as target clips, a target video with rich and diverse content may be generated. According to different scenarios, some candidate target clips with higher correlations may be selected as target clips so that content between the video clips contained in the target video is more similar, and content coherence is higher. Both the two types of target videos may be provided to the user, and the user may select one or two of them.

When there are multiple target clips that have been selected and correlations between the target clips and the candidate target clips are determined, different filtering methods may be configured. For example, correlations between the candidate target clips and the already-selected target clips may be calculated separately, and the average of a maximum correlation, the average of a minimum correlation, or the average of the correlations may be used as a correlation corresponding to a candidate target clip. Also, one of the pre-selected target clips (for example, a recently selected target clip or a first-selected target clip) may be selected, and a correlation between the selected clip and a candidate target clip may be used as the correlation corresponding to the candidate target clip.

According to an embodiment, the video generation apparatus 100 may determine an action type of an action contained in the target clips, generate the target video, based on the target clips and the action type, and display the action type of each of the target clips to the user.

In other words, when the target video is generated, action types respectively corresponding to the target clips contained in the target video may be provided to the user, and thus the user may know an action that clips included in the target video has.

The manner in which the action type is displayed to the user is not limited. According to a selective embodiment, the identifier of the action type of the target clips contained in the target video may be carried on video frames or carried on a first frame or previous video frames of the target clips. Alternatively, the identifier of the action type of the target clips contained in the target video may be carried on the last frame of a previous target clip. Accordingly, when the user plays back the target video, an action corresponding to the target video can be ascertained from video frames. For another example, the action type corresponding to each of the target clips contained in the target video may be separated from the target video and displayed to the user. For example, the action type corresponding to each of the target clips contained in the target video may be displayed to the user according to the playback order of the target clips in the target video. For example, description information of the target video may be generated, and the description information may include action types corresponding to the target video.

According to an embodiment, when the target clips are obtained, the video generation apparatus 100 may determine respective weights of the target clips, based on the intention features and the clip features of the target clips, and may filter the target clips, based on the clip features and weights of the target clips. The target clips may include action clips and/or object clips obtained through action recognition and/or object recognition with respect to the source video, action clips assigned the target level from among the action clips, action clips selected based on correlations with the intention features from among the action clips, or action clips selected based on correlations between the action clips.

According to an embodiment, the target clips may be filtered through the following operations. In detail, the video generation apparatus 100 may determine the weights of the target clips at a current time point, based on the intention features, the clip features of the target clips, and weights of the target clips determined at a previous time point, and may select target clips corresponding to the current time point, based on the clip features of the target clips, the weights of the target clips determined at the current time point, and target clips selected at the previous time point. The above operations may be performed multiple times to select a target clip corresponding to each time point.

In other words, a target clip may be selected every time point, and the target video may be generated according to an order in which target clips are selected.

When the weights of the target clips are determined at the current time point, the weights of the target clips determined at one or more previous time points may be considered. Because the weights of the target clips determined at the previous time point are considered, when the weights corresponding to the current time point are determined, historical information may also be taken into account. Thus, the weights determined at each time point may have a better relevance, and, when the target clips corresponding to the current time point are selected based on the weights determined at the current time point, target clips having better relevance with the previously selected target clips may be selected. Likewise, when the target clips are filtered based on the weights determined at the current time point, the target clips selected at the previous time point may be further considered, and thus target clips at the current time point having a better timing relationship with the pre-selected target clips can be selected.

When the above operations are performed for the first time, because there are no time points before the current time point, the weights of the target clips may be determined based on the intention features and the clip features of the target clips. Likewise, when target clips are selected at an initial time point, the target clips corresponding to the current time point may be selected based on the clip features of the target clips and the weights of the target clips determined at the current time point.

In actual applications, in order to prevent the above operations from being performed too many times or too many target clips from being selected, operation execution stop conditions may be configured. For example, when the length of the target video is requested by the user, the operation execution stop conditions may be configured according to the length of the target video required by the user. When the total length of the selected target clips is not less than the target length of the target video, the above operations may be stopped. Also, when the user does not require the video length of the target video, a default length or the number of selected target clips may be configured as the conditions for stopping the above operations. For another example, when the user does not require the video length of the target video, different processing methods may be adopted according to the types of target clips. The above methods are just a few optional methods.

In addition, it should be noted that the aforementioned target clips are not selected in a chronological sequence. For example, when a target clip corresponds to a summer scene and another target clip corresponds to an autumn scene, the target clip of the summer scene may be selected at the first time point and the target clip of the autumn scene may be selected at the second time point. The timing relationship between the target clips may be understood as a sequence relationship corresponding to a certain rule. As an illustrative example, when a recurrent neural network is used to implement the filtering of the target clips, the above-described time points may be different processing moments or time steps in the recurrent neural network.

According to an embodiment, to filter the target clips, the video generation apparatus 100 may determine weights of target clips corresponding to the first time point, based on the intention features and the clip features of the target clips, at the first time point, obtain weighted clip features, based on the weights of the target clips corresponding to the first time point, and select target clips corresponding to the first time point, based on a hidden state feature of the first time point and the weighted clip features.

The video generation apparatus 100 may determine weights of target clips corresponding to the current time point, based on the intention features, the clip features of the target clips, and a hidden state feature of a previous time point, at time points other than the first time point, obtain weighted video clip features, based on the weights of the target clips corresponding to the current time point, obtain a hidden state feature of the current time point, based on the weighted clip features of the current time point, the hidden state feature of the previous time point, and the target clips selected at the previous time point, and obtain target clips of the current time point, based on the hidden state feature of the current time point and the weighted clip features.

In a filtering method according to an embodiment, target clips included in the target video are selected based on an attention mechanism and a recurrent neural network. In existing ranking-based video generation methods, the semantic information of the video and the theme of the video content are generally not considered, and the ranking is based on simple rules, resulting in poor connectivity between the clips within a generated video. The existing ranking-based video generation methods do not satisfy the user requirements. In addition, when facing complex scenarios, it is difficult to extract and summarize video generation rules from complicated data. In order to solve this problem, an embodiment of the disclosure proposes a video generation method based on the attention mechanism, by which the user may automatically edit video clips, based on video content and user intention to generate a desired video.

The intention features reflecting the user intention are added to the calculation of an attention weight, and thus, when determining the weight of each target clip, the user intention is incorporated. In addition, because the recurrent neural network based on the attention mechanism used to obtain the target clips for each time point considers the user intention and clip features, the recurrent neural network based on the attention mechanism may extract intrinsic connection between the target clips, and may get better video generation effect than the rule-based method.

When obtaining the hidden state feature of the current time point, the hidden state feature of the previous time point, the weighted clip features of the current time point, and indexes of the target video clips selected at the previous time point operation may be used. For a certain time point, the hidden state feature of the previous time point may reflect related information of target clips recorded by a network from the first time point to the previous time point. Therefore, when the hidden state features of the current time point is obtained and the current time point is not the first time point, the hidden state features of the previous time point may be considered, and thus the target clips of the current time point having a better intrinsic connection with the target clips selected at the previous time point may be selected based on the hidden state feature and the weighted clip features of the current time point.

According to an embodiment, the video generation apparatus 100 may generate the target video by incorporating the target clips according to the orders of the time points when the target clips are selected.

Meanwhile, embodiments described above may be implemented as computer-executable programs that may be stored in a medium.

The medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

While one or more embodiments of the disclosure have been described with reference to the figures, it will be understood by those of ordinary skill in the art that various changes in form and details may be made therein without departing from the spirit and scope as defined by the following claims.

What is claimed is:

1. A video generation method comprising:
receiving a video generation request for generating a target video from source videos, wherein the video generation request includes a user voice input or a user text input indicating a target action for the target video and a target length for the target video;

obtaining a plurality of action clips into which the source videos are split, through action recognition with respect to the source videos;

allocating a plurality of levels including a first level and a second level to the plurality of action clips according to time lengths of the plurality of action clips, a time length of the first level being longer than a time length of the second level;

allocating a plurality of action types indicating contents of the plurality of action clips to the plurality of action clips based on clip features of the plurality of action clips so that an action type of an action clip of the first level is superordinate to action types of action clips of the second level corresponding to the action clip of the first level, wherein the action type of the action clip of the first level belongs to a category, and the action types of the action clips of the second level correspond to subordinate concepts of the category;

selecting one level from the plurality of levels allocated to the plurality of action clips as a target level, based on the target length for the target video included in the video generation request;

selecting target clips from among one or more action clips corresponding to the target level based on the target action for the target video included in the video generation request and the target length; and generating the target video by combining the target clips.

2. The video generation method of claim 1, wherein the selecting of the target clips from among the plurality of action clips comprises selecting the target clips from among action clips to which the target level is allocated, based on correlation between clip features of the plurality of action clips to which the target level is allocated and an intention feature corresponding to the target action.

3. The video generation method of claim 2, wherein the allocating of the plurality of levels to the plurality of action clips comprises allocating, to each of the plurality of action clips, a level corresponding to a length region to which respective time lengths of the plurality of action clips belong, from among length regions corresponding to the plurality of levels.

4. The video generation method of claim 3, wherein the allocating of the plurality of levels to the plurality of action clips comprises allocating adjacent levels to an action clip belonging to a transition length region of the adjacent levels from among the plurality of action clips.

5. The video generation method of claim 3, wherein the selecting of the one level from the plurality of levels as the target level comprises:

selecting a first level from among the plurality of levels as the target level when a length threshold of the first level is less than a limited length determined based on the target length;

comparing a first number of action clips each having a time length less than the limited length from among action clips assigned the first level with a second number of action clips each having a time length less than the limited length from among action clips assigned a second level, when the length threshold of the first level is greater than the limited length; and determining the first level as the target level according to a result of the comparing or determining the second level as the target level when the second level is a last level.

6. The video generation method of claim 5, wherein, when the first number is greater than the second number, the first level is determined as the target level, and when the second number is greater than the first number and the second level is the last level, the second level is determined as the target level.

7. The video generation method of claim 2, wherein the allocating of the plurality of levels to the plurality of action clips comprises allocating, to each of the plurality of action clips, a level corresponding to a length threshold closest to the respective time lengths of the plurality of action clips, from among length thresholds corresponding to the plurality of levels.

8. The video generation method of claim 7, wherein the selecting of the one level from the plurality of levels as the target level comprises selecting a level of which a length threshold is less than a limited length determined based on the target length, as the target level, while comparing the length thresholds of the plurality of levels with the limited length in a descending order of the plurality of levels.

9. The video generation method of claim 2, wherein the selecting of the target clips comprises:

selecting candidate target clips from among action clips to which the target level is allocated, based on correlation between clip features of the action clips to which the target level is allocated and the intention feature;

selecting, as a target clip, a candidate target clip having a largest correlation with the intention feature from among the candidate target clips; and based on correlations between the selected target clip and remaining candidate target clips, selecting some of the candidate target clips as the target clip.

10. The video generation method of claim 9, wherein the selecting of the some of the candidate target clips as the target clip comprises selecting, as the target clip, a candidate target clip having a correlation that is less than a threshold and is smallest, from among the correlations between the selected target clip and the remaining candidate target clips.

11. The video generation method of claim 2, wherein an action label of an action clip assigned a first level from among the plurality of levels is superordinate to an action label of an action clip assigned a lower level than the first level from among the plurality of levels.

12. The video generation method of claim 1, further comprising:

obtaining person clips into which the source videos are split, through person recognition with respect to the source videos;

extracting a common clip from a target clip and a person clip split from a same source video from among the target clips and the person clips; and generating the target video by using the common clip as a target clip.

13. The video generation method of claim 1, wherein the generating of the target video comprises generating the target video by combining clips selected sequentially from the target clips, based on clip features of the target clips and an intention feature corresponding to the target action.

14. The video generation method of claim 13, wherein the generating of the target video comprises excluding some of the target clips according to a result of a comparison between persons included in the target clips and a person identified from the video generation request.

15. The video generation method of claim 1, further comprising displaying the target clips by distinguishing the target clips according to action labels of the target clips.

16. The video generation method of claim 1, further comprising displaying the generated target video with action types of the target clips included in the target video.

17. A video generation method comprising:
obtaining a plurality of action clips into which source videos are split, through action recognition with respect to the source videos;
selecting target clips from among the plurality of action clips, based on correlation between clip features of at least some of the plurality of action clips and an intention feature extracted from a video generation request; and
generating a target video by combining at least some of the target clips,
wherein the generating of the target video comprises generating the target video by combining target clips selected sequentially from target clips, based on clip features of the target clips and the intention feature,
wherein the generating of the target video comprises performing a selection of the target clips at each time point,
the performing the selection of the target clips at each time point comprises:
determining a weight of target clips at a current time point, based on the intention feature, the clip features, and a weight of target clips determined at a previous time point; and
selecting a target clip corresponding to the current time point, based on the clip features, the weight of target clips determined at the current time point, and target clips selected at the previous time point.

18. A video generation apparatus comprising:
a memory storing a program; and
a processor configured to execute the program stored in the memory,
wherein the processor is configured to execute the program to:
receive a video generation request for generating a target video from source videos, wherein the video generation request includes a user voice input or a user text input indicating a target action for the target video and a target length for the target video;
obtain a plurality of action clips into which the source videos are split, through action recognition with respect to the source videos,
allocate a plurality of levels including a first level and a second level to the plurality of action clips according to time lengths of the plurality of action clips, a time length of the first level being longer than a time length of the second level,
allocate a plurality of action types indicating contents of the plurality of action clips to the plurality of action clips based on clip features of the plurality of action clips so that an action type of an action clip of the first level is superordinate to action types of action clips of the second level corresponding to the action clip of the first level, wherein the action type of the action clip of the first level belongs to a category, and the action types of the action clips of the second level correspond to subordinate concepts of the category,
select one level from the plurality of levels allocated to the plurality of action clips as a target level, based on the target length for the target video included in the video generation request,
select target clips from among one or more action clips corresponding to the target level based on the target action for the target video included in the video generation request and the target length, and
generate the target video by combining the target clips.

19. The video generation apparatus of claim 18, wherein the processor is further configured to:
select the target clips from among action clips to which the target level is allocated, based on correlation between clip features of the plurality of action clips to which the target level is allocated and an intention feature corresponding to the target action,
allocate, to each of the plurality of action clips, a level corresponding to a length region to which respective time lengths of the plurality of action clips belong, from among length regions corresponding to the plurality of levels,
wherein the processor is further configured to:
select a first level from among the plurality of levels as the target level when a length threshold of the first level is less than a limited length determined based on the target length,
compare a first number of action clips each having a time length less than the limited length from among action clips assigned the first level with a second number of action clips each having a time length less than the limited length from among action clips assigned a second level, when the length threshold of the first level is greater than the limited length, and
determine the first level as the target level according to a result of the comparing or determining the second level as the target level when the second level is a last level.

\* \* \* \* \*